(12) United States Patent
Taguchi

(10) Patent No.: US 9,140,565 B2
(45) Date of Patent: Sep. 22, 2015

(54) TRAVEL PLAN GENERATION METHOD AND TRAVEL PLAN GENERATION DEVICE

(75) Inventor: Koji Taguchi, Isehara (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 13/977,256

(22) PCT Filed: Jan. 20, 2011

(86) PCT No.: PCT/JP2011/050980
§ 371 (c)(1),
(2), (4) Date: Jun. 28, 2013

(87) PCT Pub. No.: WO2012/098663
PCT Pub. Date: Jul. 26, 2012

(65) Prior Publication Data
US 2013/0289874 A1    Oct. 31, 2013

(51) Int. Cl.
*B60W 40/04* (2006.01)
*B60W 40/06* (2012.01)
*G01C 21/34* (2006.01)
*B60W 30/14* (2006.01)

(52) U.S. Cl.
CPC .......... *G01C 21/34* (2013.01); *B60W 30/146* (2013.01); *B60W 2550/142* (2013.01); *B60W 2550/143* (2013.01); *B60W 2550/146* (2013.01); *B60W 2550/22* (2013.01)

(58) Field of Classification Search
CPC .............. B60W 2550/142; B60W 2550/143; B60W 2550/146; B60W 2550/20; B60W 2550/22; B60W 2550/30; B60W 40/00; B60W 40/02; B60W 40/04; B60W 40/06; B60T 2201/00; B60T 2201/02; B60T 2201/16; G01C 21/34; G01C 21/3407; G01C 21/3492
USPC ............ 701/1, 23, 25, 26, 36, 65, 70, 72, 93, 701/96, 117, 118, 119, 123, 400, 408, 409, 701/410, 411, 414, 415, 423, 437, 300, 701/301; 340/995.1, 995.13, 995.2, 438, 340/439, 441
See application file for complete search history.

(56) References Cited

U.S. PATENT DOCUMENTS 6,725,144 B2 * 4/2004 Shiimado et al. ................ 701/65
8,670,907 B2 * 3/2014 Kondou et al. .................. 701/55

(Continued)

FOREIGN PATENT DOCUMENTS

| JP | A-2008-269357 | 11/2008 |
|---|---|---|
| JP | A-2009-286185 | 12/2009 |

(Continued)

*Primary Examiner* — Thomas Tarcza
*Assistant Examiner* — Edward Pipala
(74) *Attorney, Agent, or Firm* — Oliff PLC

(57) ABSTRACT

The travel plan generation method includes a maximum speed limit section setting step of setting a maximum speed limit section, a low speed allowed section setting step of setting a low speed allowed section which is in front of the maximum speed limit section on the route and is in a low speed allowable distance range from the maximum speed limit section, and a travel plan generation step of generating a travel plan in which the speed of the vehicle is limited to a speed limit or less in the maximum speed limit section and the speed of the vehicle is not reduced to a low discomfort speed or less in sections other than the maximum speed limit section and the low speed allowed section.

24 Claims, 9 Drawing Sheets

(56) References Cited

U.S. PATENT DOCUMENTS

| | | | |
|---|---|---|---|
| 2009/0319138 A1* | 12/2009 | Kondou et al. | 701/55 |
| 2012/0290173 A1* | 11/2012 | Irie | 701/41 |
| 2013/0013164 A1 | 1/2013 | Taguchi | |
| 2013/0018562 A1* | 1/2013 | Nakai et al. | 701/93 |
| 2013/0131898 A1* | 5/2013 | Kumar et al. | 701/20 |

FOREIGN PATENT DOCUMENTS

| | | |
|---|---|---|
| JP | A-2010-143304 | 7/2010 |
| JP | A-2010-151115 | 7/2010 |
| JP | A-2010-167994 | 8/2010 |
| JP | A-2010-264841 | 11/2010 |
| WO | WO 2011/101949 A1 | 8/2011 |

* cited by examiner

TRAVEL PLAN GENERATION METHOD AND TRAVEL PLAN GENERATION DEVICE

TECHNICAL FIELD

The present invention relates to a travel plan generation method and a travel plan generation device which generate a vehicle travel plan.

BACKGROUND ART

There is Japanese Unexamined Patent Application Publication No. 2010-143304 as a technical document in this field. A vehicle travel assistance control method disclosed in Japanese Unexamined Patent Application Publication No. 2010-143304 sets a stop point where the vehicle is stopped on the route of the vehicle and determines whether the vehicle can coast to the next stop point. Then, when it is determined that the vehicle can coast to the next stop point, the driving mode changes to coasting to reduce the energy consumption of the vehicle.

CITATION LIST

Patent Literature

[Patent Literature 1] Japanese Unexamined Patent Application Publication No. 2010-143304

SUMMARY OF INVENTION

Technical Problem

However, when a travel plan is generated considering only energy consumption as in the above-mentioned vehicle travel assistance control method, the general driver drives the vehicle at an excessively low speed, which is not a socially acceptable conduct. As a result, the travel of the vehicle based on the travel plan gives discomfort to the driver or neighboring vehicles.

An object of the invention is to provide a travel plan generation method capable of generating a travel plan which reduces discomfort to the driver.

Solution to Problem

In order to solve the above-mentioned problems, according to an aspect of the invention, there is provided a travel plan generation method that generates a travel plan along a route of a vehicle. The travel plan generation method includes a maximum speed limit section setting step of setting a maximum speed limit section in which a maximum speed of the vehicle is limited on the basis of a road environment on the route, a low speed allowed section setting step of setting a low speed allowed section which is in front of the maximum speed limit section (that is, closer to the vehicle side than the maximum speed limit section) on the route and is in a predetermined low speed allowable distance range from the maximum speed limit section, and a travel plan generation step of generating a travel plan in which the speed of the vehicle is limited to a speed limit or less in the maximum speed limit section and the speed of the vehicle is not reduced to a predetermined low discomfort speed or less in sections other than the maximum speed limit section and the low speed allowed section.

According to the travel plan generation method of the above-mentioned aspect of the invention, when the vehicle decelerates to the maximum speed limit section in which the maximum speed of the vehicle is limited, such as an intersection, curve, or crossing section, reducing the speed of the vehicle at a position that is away from the maximum speed limit section is not a socially acceptable conduct, which causes discomfort to the driver of the vehicle or neighboring vehicles. Therefore, the travel plan is generated in which the vehicle does not decelerate to a predetermined low discomfort speed or less in sections other than the maximum speed limit section and the low speed allowed section. Therefore, according to the travel plan generation method, the vehicle does not travel at a too low speed to cause discomfort to the driver until it sufficiently approaches the maximum speed limit section and enters the low speed allowed section. Therefore, it is possible to generate a travel plan that is socially acceptable and reduces the discomfort to the driver.

The travel plan generation method according to the above-mentioned aspect of the invention may further include an acceleration and deceleration section setting step of setting an acceleration section in which the vehicle accelerates and a deceleration section in which the vehicle decelerates. In the acceleration and deceleration section setting step, the deceleration section may be set immediately before the maximum speed limit section (that is, closer to the vehicle side than the maximums speed limit section).

According to the travel plan generation method of the above-mentioned aspect of the invention, since the deceleration section is set immediately before the maximum speed limit section, it is possible to generate a travel plan in which the average speed is high and is close to the general traveling speed, as compared to when the acceleration section is set immediately before the maximum speed limit section. Therefore, it is possible to reduce discomfort to the driver or neighboring vehicles.

The travel plan generation method according to the above-mentioned aspect of the invention may further include an acceleration and deceleration section setting step of setting an acceleration section in which the vehicle accelerates and a deceleration section in which the vehicle decelerates. In the acceleration and deceleration section setting step, the acceleration section may be set in front of the deceleration section (that is, closer to the vehicle side than the deceleration section).

According to the travel plan generation method of the above-mentioned aspect of the invention, since the acceleration section is set before the deceleration section, it is possible to generate a travel plan in which the average speed is high and is close to the general traveling speed, as compared to when the deceleration section is set before the acceleration section. Therefore, it is possible to reduce discomfort to the driver or neighboring vehicles.

In the travel plan generation method according to the above-mentioned aspect of the invention, at least one of the low speed allowable distance and the low discomfort speed may be changed on the basis of traffic conditions around the vehicle.

According to the travel plan generation method of the above-mentioned aspect of the invention, since the low speed allowable distance or the low discomfort speed is changed on the basis of the traffic conditions around the vehicle, it is possible to generate a travel plan corresponding to the traffic conditions and reduce discomfort to the driver or neighboring vehicles.

In the travel plan generation method according to the above-mentioned aspect of the invention, when there is another vehicle following the vehicle, at least one of a process of increasing maximum deceleration of the deceleration section, a process of decreasing the low speed allowable distance, and a process of increasing the low discomfort speed, as compared to when there is no other vehicle following the vehicle, may be performed.

According to the travel plan generation method of the above-mentioned aspect of the invention, when there is another vehicle following the vehicle, the maximum deceleration of the deceleration section increases, the low speed allowable distance decreases, or the low discomfort speed increases. Therefore, it is possible to generate a travel plan with a long acceleration section, as compared to when there is no other vehicle following the vehicle. According to the travel plan generation method, since the travel plan in which the average speed is close to the general travel speed is generated considering the following vehicle, it is possible to reduce discomfort to the driver and the following vehicle.

In the travel plan generation method according to the above-mentioned aspect of the invention, when there is another vehicle in front of the vehicle, at least one of the process of increasing the maximum deceleration of the deceleration section, the process of decreasing the low speed allowable distance, and the process of increasing the low discomfort speed, as compared to when there is no other vehicle in front of the vehicle, may be performed.

According to the travel plan generation method of the above-mentioned aspect of the invention, when there is another vehicle in front of the vehicle, the maximum deceleration of the deceleration section increases, the low speed allowable distance decreases, or the low discomfort speed increases. Therefore, it is possible to generate a travel plan with a long acceleration section, as compared to when there is no other vehicle in front of the vehicle. According to the travel plan generation method, since the travel plan in which the average speed is close to the general travel speed is generated considering the vehicle in front, it is possible to reduce discomfort to the driver and the vehicle in front.

In the travel plan generation method according to the above-mentioned aspect of the invention, when the density of other vehicles around the vehicle is more than a predetermined vehicle density threshold value, the low discomfort speed may be changed on the basis of vehicle speed statistical information of neighboring vehicles which travel near the vehicle.

According to the travel plan generation method of the above-mentioned aspect of the invention, since the low discomfort speed is changed on the basis of the vehicle speed statistical information of neighboring vehicles which travel near the vehicle, it is possible to generate a travel plan corresponding to the flow of neighboring vehicles. Therefore, it is possible to reduce discomfort to the driver and the neighboring vehicles.

In the travel plan generation method according to the above-mentioned aspect of the invention, when the density of other vehicles around the vehicle is more than the predetermined vehicle density threshold value, the low discomfort speed may be changed to a speed obtained by subtracting a value that is two times a standard deviation from an average speed in the vehicle speed statistical information.

According to the travel plan generation method of the above-mentioned aspect of the invention, since the low discomfort speed is changed to the speed obtained by subtracting the value that is two times the standard deviation from the average speed in the vehicle speed statistical information, the low discomfort speed can be set so as not to be less than the speed of a low-speed vehicle which is approximately one in every ten neighboring vehicles. Therefore, it is possible to generate a travel plan capable of improving fuel efficiency while reducing discomfort to the driver and the neighboring vehicles.

In the travel plan generation method according to the above-mentioned aspect of the invention, when the maximum speed limit section is in a poor visibility environment, at least one of a process of decreasing maximum deceleration of the deceleration section and a process of increasing the low speed allowable distance, as compared to when the maximum speed limit section is not in the poor visibility environment, may be performed.

According to the travel plan generation method of the above-mentioned aspect of the invention, when the maximum speed limit section is in the poor visibility environment, the maximum deceleration of the deceleration section decreases or the low speed allowable distance increases. Therefore, it is possible to generate a travel plan with low deceleration, as compared to when the maximum speed limit section is not in the poor visibility environment. When the vehicle enters the poor visibility environment in which the visibility is poor at a high speed, the driver is likely to feel uneasy. Therefore, according to the travel plan generation method, when the maximum speed limit section is in the poor visibility environment, the travel plan with low deceleration is generated to prevent the driver from feeling uneasy.

In the travel plan generation method according to the above-mentioned aspect of the invention, when the maximum speed limit section is a left-turn intersection or when the maximum speed limit section is in an urban area, it may be determined that the maximum speed limit section is in the poor visibility environment.

According to the travel plan generation method of the above-mentioned aspect of the invention, when the maximum speed limit section is a left-turn intersection or when the maximum speed limit section is in an urban area, it is likely to be in the poor visibility environment in which the visibility is poor. Therefore, when the maximum speed limit section is the left-turn intersection or when it is in the urban area, it is determined that the maximum speed limit section is in the poor visibility environment, which makes it possible to appropriately prevent the driver from feeling uneasy.

In the travel plan generation method according to the above-mentioned aspect of the invention, when the maximum speed limit section is a tapered curve, at least one of a process of decreasing maximum deceleration of the deceleration section and a process of increasing the low speed allowable distance, as compared to when the maximum speed limit section is not the tapered curve, may be performed.

According to the travel plan generation method of the above-mentioned aspect of the invention, when the maximum speed limit section is a tapered curve in which a road width on the entrance side is more than that on the exit side, the maximum deceleration of the deceleration section decreases or the low speed allowable distance increases. Therefore, it is possible to generate a travel plan with low deceleration, as compared to when the maximum speed limit section is not the tapered curve. When the vehicle enters the tapered curve at a high speed, the driver is likely to feel uneasy. Therefore, according to the travel plan generation method of the above-mentioned aspect of the invention, when the maximum speed limit section is the tapered curve, the travel plan with low deceleration is generated to prevent the driver from feeling uneasy.

In the travel plan generation method according to the above-mentioned aspect of the invention, when the maximum speed limit section is a traffic signal section and it is estimated that a traffic signal in the traffic signal section is green at the time the vehicle reaches the traffic signal section, a maximum deceleration section of the deceleration section may be set ahead of that when it is estimated that the traffic signal in the traffic signal section is not green at the time the vehicle reaches the traffic signal section.

In general, the driver brakes the vehicle to complete deceleration at a position that is some distance ahead of the traffic signal, not immediately before the traffic signal, and passes through the traffic signal. Therefore, according to the travel plan generation method of the above-mentioned aspect of the invention, when it is determined that the traffic signal in the traffic signal section is green at the time the vehicle reaches the traffic signal section, the maximum deceleration section is set ahead. Therefore, it is possible to generate a travel plan capable of reducing discomfort to the driver.

According to another aspect of the invention, there is provided a travel plan generation device that generates a travel plan along a route of a vehicle. The travel plan generation device includes a maximum speed limit section setting unit that sets a maximum speed limit section in which a maximum speed of the vehicle is limited on the basis of a road environment on the route, a low speed allowed section setting unit that sets a low speed allowed section which is in front of the maximum speed limit section (that is, closer to the vehicle side than the maximum speed limit section) on the route and is in a predetermined low speed allowable distance range from the maximum speed limit section, and a travel plan generation unit that generates a travel plan in which the speed of the vehicle is limited to a speed limit or less in the maximum speed limit section and the speed of the vehicle is not reduced to a predetermined low discomfort speed or less in sections other than the maximum speed limit section and the low speed allowed section.

According to the travel plan generation device of the above-mentioned aspect of the invention, when the vehicle decelerates to the maximum speed limit section in which the maximum speed of the vehicle is limited, such as an intersection, curve, or crossing section, reducing the speed of the vehicle at a position that is away from the maximum speed limit section is not a socially acceptable conduct, which causes discomfort to the driver of the vehicle or neighboring vehicles. Therefore, the travel plan is generated in which the vehicle does not decelerate to a predetermined low discomfort speed or less in the sections other than the maximum speed limit section and the low speed allowed section. According to the travel plan generation device, the vehicle does not travel at a too low speed to cause discomfort to the driver until it approaches the maximum speed limit section and enters the low speed allowed section. Therefore, it is possible to generate a travel plan that is socially acceptable and reduces discomfort to the driver.

The travel plan generation device according to the above-mentioned aspect of the invention may further include an acceleration and deceleration section setting unit that sets an acceleration section in which the vehicle accelerates and a deceleration section in which the vehicle decelerates. The acceleration and deceleration section setting unit may set the deceleration section immediately before the maximum speed limit section (that is, closer to the vehicle side than the maximum speed limit section).

According to the travel plan generation device of the above-mentioned aspect of the invention, since the deceleration section is set immediately before the maximum speed limit section, it is possible to generate a travel plan in which the average speed is high and is close to the general traveling speed, as compared to when the acceleration section is set immediately before the maximum speed limit section. Therefore, it is possible to reduce discomfort to the driver or neighboring vehicles.

The travel plan generation device according to the above-mentioned aspect of the invention may further include an acceleration and deceleration section setting unit that sets an acceleration section in which the vehicle accelerates and a deceleration section in which the vehicle decelerates. The acceleration and deceleration section setting unit may set the acceleration section in front of the deceleration section (that is, closer to the vehicle side than the deceleration section).

According to the travel plan generation device of the above-mentioned aspect of the invention, since the acceleration section is set before the deceleration section, it is possible to generate a travel plan in which the average speed is high and is close to the general traveling speed, as compared to when the deceleration section is set before the acceleration section. Therefore, it is possible to reduce discomfort to the driver or neighboring vehicles.

In the travel plan generation device according to the above-mentioned aspect of the invention, at least one of the low speed allowable distance and the low discomfort speed may be changed on the basis of traffic conditions around the vehicle.

According to the travel plan generation device of the above-mentioned aspect of the invention, since the low speed allowable distance or the low discomfort speed is changed on the basis of the traffic conditions around the vehicle, it is possible to generate a travel plan corresponding to the traffic conditions and reduce discomfort to the driver or neighboring vehicles.

In the travel plan generation device according to the above-mentioned aspect of the invention, when there is another vehicle following the vehicle, at least one of a process of increasing maximum deceleration of the deceleration section, a process of decreasing the low speed allowable distance, and a process of increasing the low discomfort speed, as compared to when there is no other vehicle following the vehicle, may be performed.

According to the travel plan generation device of the above-mentioned aspect of the invention, when there is another vehicle following the vehicle, the maximum deceleration of the deceleration section increases, the low speed allowable distance decreases, or the low discomfort speed increases. Therefore, it is possible to generate a travel plan with a long acceleration section, as compared to when there is no other vehicle following the vehicle. According to the travel plan generation method, since the travel plan in which the average speed is close to the general travel speed is generated considering the following vehicle, it is possible to reduce discomfort to the driver and the following vehicle.

In the travel plan generation device according to the above-mentioned aspect of the invention, when there is another vehicle in front of the vehicle, at least one of the process of increasing the maximum deceleration of the deceleration section, the process of decreasing the low speed allowable distance, and the process of increasing the low discomfort speed, as compared to when there is no other vehicle in front of the vehicle, may be performed.

According to the travel plan generation device of the above-mentioned aspect of the invention, when there is another vehicle in front of the vehicle, the maximum deceleration of the deceleration section increases, the low speed allowable distance decreases, or the low discomfort speed increases. Therefore, it is possible to generate a travel plan with a long acceleration section, as compared to when there is no other vehicle in front of the vehicle. According to the travel plan generation device, since the travel plan in which the average speed is close to the general travel speed is generated considering the vehicle in front, it is possible to reduce discomfort to the driver and the vehicle in front.

In the travel plan generation device according to the above-mentioned aspect of the invention, when the density of other vehicles around the vehicle is more than a predetermined vehicle density threshold value, the low discomfort speed may be changed on the basis of vehicle speed statistical information of neighboring vehicles which travel near the vehicle.

According to the travel plan generation device of the above-mentioned aspect of the invention, since the low discomfort speed is changed on the basis of the vehicle speed statistical information of the neighboring vehicles which travel near the vehicle, it is possible to generate a travel plan based on the flow of the neighboring vehicles. Therefore, it is possible to reduce discomfort to the driver and the neighboring vehicles.

In the travel plan generation device according to the above-mentioned aspect of the invention, when the density of other vehicles around the vehicle is more than the predetermined vehicle density threshold value, the low discomfort speed may be changed to a speed obtained by subtracting a value that is two times a standard deviation from an average speed in the vehicle speed statistical information.

According to the travel plan generation device of the above-mentioned aspect of the invention, since the low discomfort speed is changed to the speed obtained by subtracting the value that is two times the standard deviation from the average speed in the vehicle speed statistical information, the low discomfort speed can be set so as not to be less than the speed of a neighboring low-speed vehicle which is about one in every ten neighboring vehicles. Therefore, it is possible to generate a travel plan capable of improving fuel efficiency while reducing discomfort to the driver and the neighboring vehicles.

In the travel plan generation device according to the above-mentioned aspect of the invention, when the maximum speed limit section is in a poor visibility environment, at least one of a process of decreasing maximum deceleration of the deceleration section and a process of increasing the low speed allowable distance, as compared to when the maximum speed limit section is not in the poor visibility environment, may be performed.

According to the travel plan generation device of the above-mentioned aspect of the invention, when the maximum speed limit section is in the poor visibility environment, the maximum deceleration of the deceleration section decreases or the low speed allowable distance increases. Therefore, it is possible to generate a travel plan with low deceleration, as compared to when the maximum speed limit section is not in the poor visibility environment. When the vehicle enters the poor visibility environment at a high speed, the driver is likely to feel uneasy. Therefore, according to the travel plan generation device, when the maximum speed limit section is in the poor visibility environment, the travel plan with low deceleration is generated to prevent the driver from feeling uneasy.

In the travel plan generation device according to the above-mentioned aspect of the invention, when the maximum speed limit section is a left-turn intersection or when the maximum speed limit section is in an urban area, it may be determined that the maximum speed limit section is in the poor visibility environment.

According to the travel plan generation device of the above-mentioned aspect of the invention, when the maximum speed limit section is a left-turn intersection or when the maximum speed limit section is in an urban area, it is likely to be in the poor visibility environment in which visibility is poor. Therefore, when the maximum speed limit section is the left-turn intersection or when it is in the urban area, it is determined that the maximum speed limit section is in the poor visibility environment, which makes it possible to appropriately prevent the driver from feeling uneasy.

In the travel plan generation device according to the above-mentioned aspect of the invention, when the maximum speed limit section is a tapered curve, at least one of a process of decreasing maximum deceleration of the deceleration section and a process of increasing the low speed allowable distance, as compared to when the maximum speed limit section is not the tapered curve, may be performed.

According to the travel plan generation device of the above-mentioned aspect of the invention, when the maximum speed limit section is a tapered curve in which a road width at the entrance is more than that at the exit, the maximum deceleration of the deceleration section decreases or the low speed allowable distance increases. Therefore, it is possible to generate a travel plan with low deceleration, as compared to when the maximum speed limit section is not the tapered curve. When the vehicle enters the tapered curve at a high speed, the driver is likely to feel uneasy. Therefore, according to the travel plan generation device of the above-mentioned aspect of the invention, when the maximum speed limit section is the tapered curve, the travel plan with low deceleration is generated to prevent the driver from feeling uneasy.

In the travel plan generation device according to the above-mentioned aspect of the invention, when the maximum speed limit section is a traffic signal section and it is estimated that a traffic signal in the traffic signal section is green at the time the vehicle reaches the traffic signal section, a maximum deceleration section of the deceleration section may be set ahead of that when it is estimated that the traffic signal in the traffic signal section is not green at the time the vehicle reaches the traffic signal section.

In general, the driver brakes the vehicle to complete deceleration at a position that is some distance ahead of the traffic signal, not immediately before the traffic signal, and passes through the traffic signal. Therefore, according to the travel plan generation device of the above-mentioned aspect of the invention, when it is determined that the traffic signal in the traffic signal section is green at the time the vehicle reaches the traffic signal section, the maximum deceleration section is set ahead. Therefore, it is possible to generate a travel plan capable of reducing discomfort to the driver.

Advantageous Effects of Invention

According to the invention, it is possible to generate a travel plan which reduces discomfort to the driver.

DESCRIPTION OF EMBODIMENTS

Figure 1:
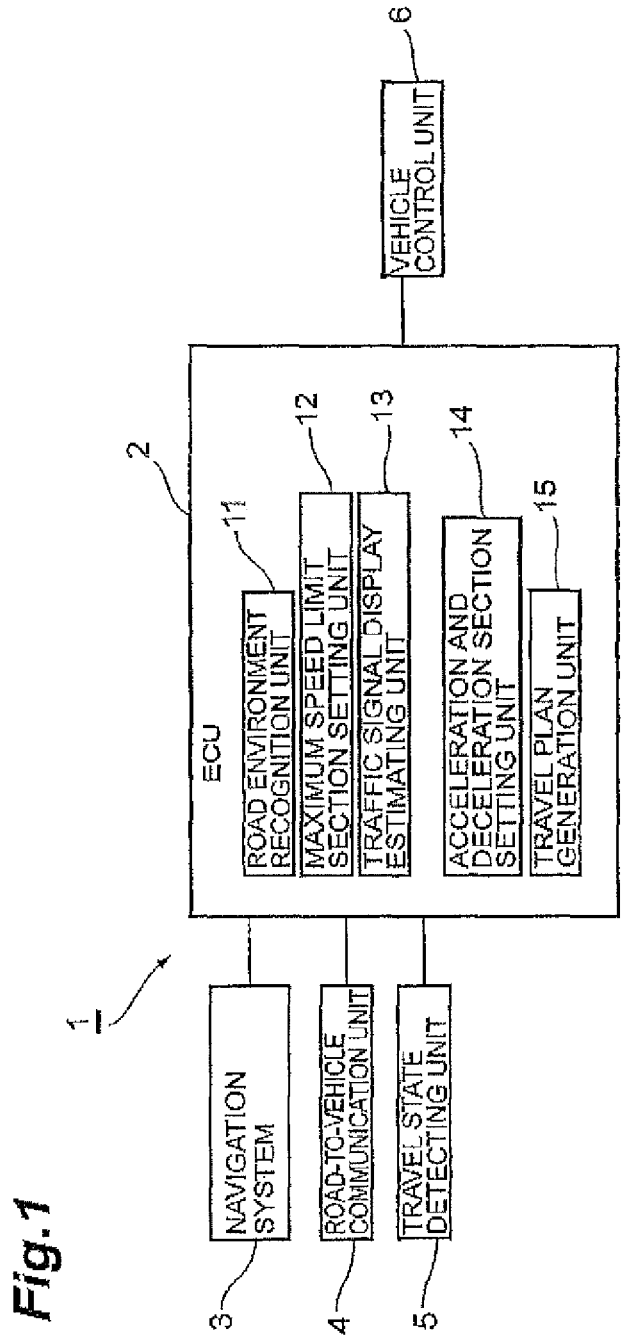
FIG. 1 is a block diagram illustrating a travel plan generation device according to a first embodiment.

Hereinafter, exemplary embodiments of the invention will be described in detail with reference to the accompanying drawings. In the drawings, the same or similar components are denoted by the same reference numerals and the description thereof will not be repeated.

First Embodiment

As shown in FIG. 1, a travel plan generation device 1 according to a first embodiment generates a travel plan along the route of a vehicle. The travel plan generation device 1 is provided in a hybrid vehicle which uses both a gasoline engine and an electric motor as driving power. The hybrid vehicle includes a regenerative braking system which uses the electric motor as a power generator, converts kinetic energy into electric energy, and brakes the vehicle.

The travel plan generation device 1 sets a maximum speed limit section in which the maximum speed of the vehicle is limited according to a road environment, such as an intersection, a curve, or a crossing, on the mute. The travel plan generation device 1 sets speed limit conditions for limiting the speed of the vehicle to the maximum speed limit section. The travel plan generation device 1 generates a vehicle travel plan so as to satisfy the speed limit conditions of the maximum speed limit section.

In addition, the travel plan generation device 1 mainly uses high-efficiency acceleration using the number of revolutions of the engine with high fool efficiency and free-run deceleration to generate the travel plan, in order to optimize fuel efficiency. The free-run deceleration means coasting deceleration without applying power to the vehicle in the acceleration direction and the deceleration direction. The free-run deceleration corresponds to deceleration when the vehicle travels in neutral gear. In the free-run deceleration on the flat road, for example, a deceleration of −0.02 G is applied to the vehicle.

The travel plan generation device 1 sets a high-efficiency acceleration section in which high-efficiency acceleration is performed and a free-run deceleration section in which free-run deceleration is performed on the route of the vehicle. The travel plan generation device 1 appropriately combines the high-efficiency acceleration section and the free-run deceleration section to generate the travel plan satisfying the speed limit conditions of the maximum speed limit section while optimizing fuel efficiency.

When an impractical travel plan in which the speed of the vehicle is equal to or less than 0 km/h is generated, the travel plan generation device 1 sets a regenerative braking section in which regenerative braking is allowed to a portion of the free-run deceleration section to extend the high-efficiency acceleration section, improves an average speed, and removes the region in which the speed of the vehicle is equal to or less than 0 km/h.

Figure 2:
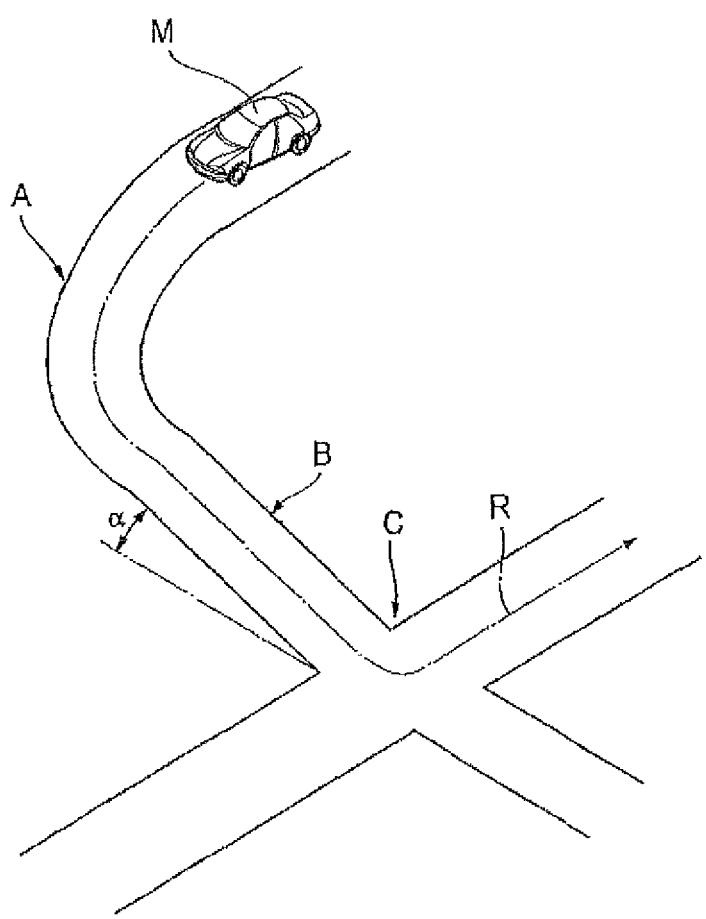
FIG. 2 is a diagram illustrating an example of a road environment on the route of a vehicle including the travel plan generation device.
Figure 3:
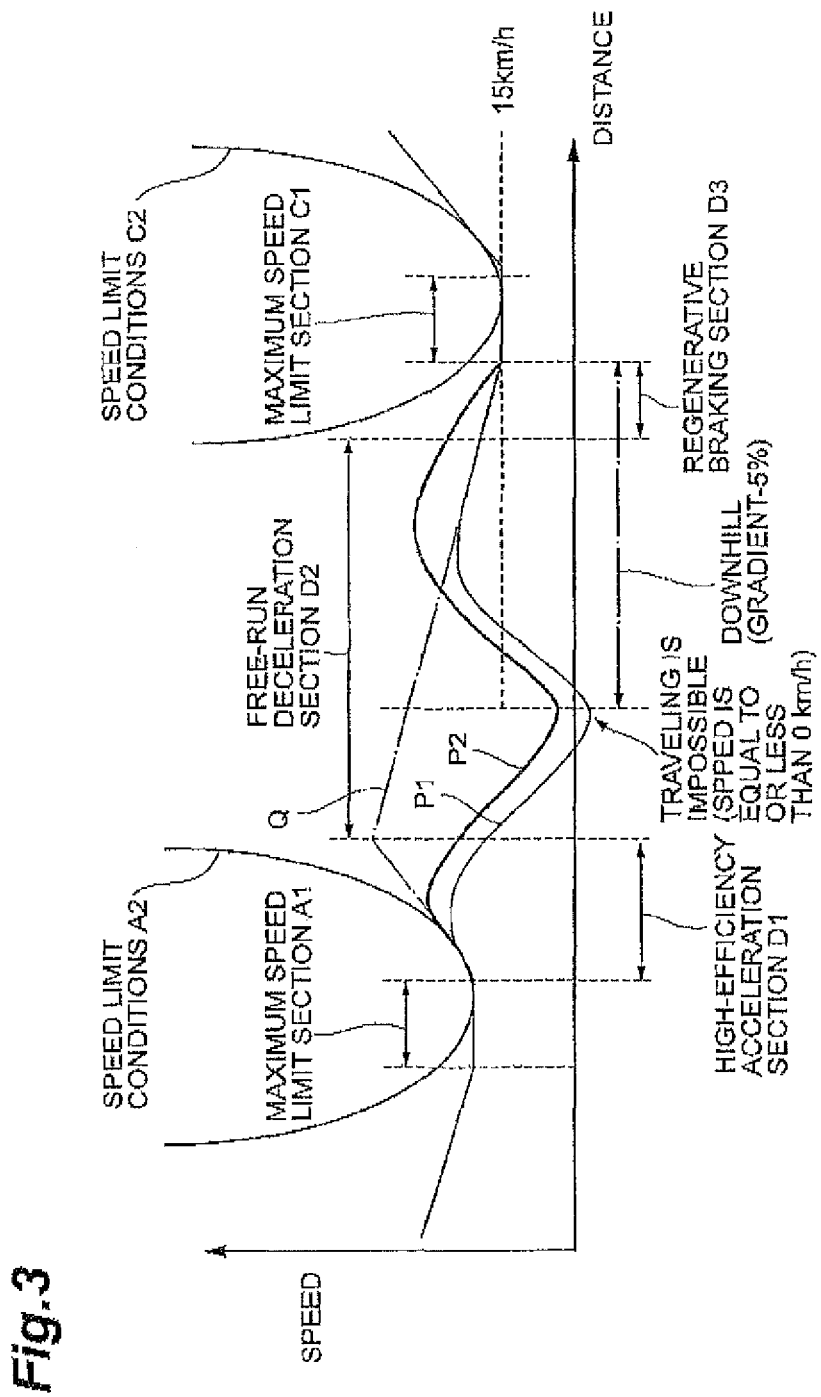
FIG. 3 is a graph illustrating a speed pattern of a travel plan along the route of the vehicle shown in FIG. 2.

Next, a case in which the speed of the vehicle is equal to or less than 0 km/h in the travel plan will be described with reference to FIGS. 2 and 3. FIG. 2 is a diagram illustrating a road environment on a route R of a vehicle M including the travel plan generation device 1. FIG. 3 is a graph illustrating the speed pattern of the travel plan along the route R shown in FIG. 2.

As shown in FIG. 2, there are three road environments, such as a left curve A, a downhill road B, and a crossroads C on the route R of the vehicle M. The route R of the vehicle M includes the left curve A, the downhill road B, and a left turn at the crossroads C. The left curve A is a slightly sharp curve including a portion with a curvature radius of 50 R or less (curvature radius is equal to or less than 50 m). The downhill road B has a constant gradient α (for example, −5%).

In this case, the travel plan generation device 1 sets maximum speed limit sections A1 and C1 to the left curve A and the crossroads C, respectively. The maximum speed limit sections A1 and C1 are not set to the entire left curve A and the entire crossroads C, but are set only to a section in which, for example, a road shape or a route has a curvature radius of 50 R or less.

In FIG. 3, the speed limit conditions A2 and C2 in the maximum speed limit sections A1 and C1 are represented by curves. Since a method of calculating the speed limit conditions A2 and C2 has been known, the description thereof will not be repeated. In addition, the speed limit conditions A2 and C2 are not necessarily set so as to draw the curves shown in FIG. 3. A method of setting the speed limit conditions A2 and C2 is appropriately selected from various setting methods according to situations. The travel plan generation device 1 sets the maximum speed limit to 20 km/h under the speed limit conditions of the maximum speed limit section A1 and sets the maximum speed limit to 15 km/h under the speed limit conditions of the maximum speed limit section C1.

A speed pattern P1 shown in FIG. 3 is the speed pattern of the travel plan which is generated using only a high-efficiency acceleration section D1 and a free-run deceleration section D2 in order to optimize fuel efficiency. As in the speed pattern P1, when deceleration to 15 km/h, which is a speed limit in the maximum speed limit section C1, is achieved only by the free-run deceleration, a region in which the speed of the vehicle is equal to or less than 0 km/h is generated in the downhill road B even in a free-run state since the vehicle M accelerates.

Therefore, when it is determined that the region in which the speed of the vehicle is equal to or less than 0 km/h is generated, the travel plan generation device 1 sets a regenerative braking section D3 in which regenerative braking is allowed to a portion of the free-nm deceleration section D2. The invention is not limited to the structure in which full regenerative braking is performed in the entire regenerative braking section D3. In the regenerative braking section D3, the degree of regenerative braking is adjusted such that appropriate deceleration is achieved. In addition, in the regenerative braking section D3, a hydraulic brake is also used, if necessary. In FIG. 3, Q indicates a target value of speed control when the road environment is a flat road.

The travel plan generation device 1 sets the regenerative braking section D3 in which deceleration is more than that in the free-run deceleration section D2. In this way, the travel plan generation device 1 sufficiently ensures the length of the high-efficiency acceleration section D1, improves the average speed, and generates the travel plan of the speed pattern P2 without the region in which the speed of the vehicle is equal to or less than 0 km/h. In this embodiment, the region in which the speed of the vehicle is equal to or less than 0 km/h is removed. However, in practice, the invention is not limited to the region in which the speed of the vehicle is equal to or less than 0 km/h. For example, when there is a region in which the speed of the vehicle is equal to or less than 5 km/h, the region may be removed.

Next, the structure of the travel plan generation device 1 will be described.

As shown in FIG. 1, the travel plan generation device 1 according to the first embodiment includes an ECU [Electronic Control Unit] 2 which controls the overall operation of the device 1. The ECU 2 is an electronic control unit including a CPU [Central Processing Unit], a ROM [Read Only Memory], and a RAM [Random Access Memory]. The ECU 2 is connected to a navigation system 3, a road-to-vehicle communication unit 4, a travel state detecting unit 5, and a vehicle control unit 6.

For example, the navigation system 3 detects the current position of the vehicle and perform route guidance to the destination. The navigation system 3 includes a GPS [Global Positioning System] receiving unit which detects the current position of the vehicle using a GPS and a map database which stores road map information. Examples of the road map information stored in the map database include road shape information, such as information about the curvature of curves, road gradient information, and information about road facilities, such as crossings, traffic signals, and temporary stop lines.

The navigation system 3 includes a display which displays image information to the driver and a touch panel which receives an operation input of the driver. That is, the navigation system 3 also functions as an HMI [Human Machine Interface]. When the driver inputs the destination of the vehicle, the navigation system 3 calculates a route from the present point of the vehicle to the destination. The navigation system 3 transmits the route information of the vehicle, the current position information of the vehicle, and information about a road map around the current position of the vehicle to the ECU 2.

The road-to-vehicle communication unit 4 performs road-to-vehicle communication with infrastructure facilities, such as optical beacons, installed on the road. The road-to-vehicle communication unit 4 performs road-to-vehicle communication to acquire the display timing information of traffic signals on the route of the vehicle or peripheral traffic information. The road-to-vehicle communication unit 4 transmits the display timing information of the traffic signals or the traffic information to the ECU 2.

The travel state detecting unit 5 detects a travel state, such as the steering angle, speed, acceleration, lateral acceleration, and yaw rate of the vehicle. The travel state detecting unit 5 includes a plurality of sensors, such as a steering angle sensor, a vehicle speed sensor, and a lateral acceleration sensor. The travel state detecting unit 5 transmits travel state information about the travel state of the vehicle to the ECU 2.

The vehicle control unit 6 includes a plurality of electronic control units, such as an engine control unit and a steering control unit, and controls the travel of the vehicle. The vehicle control unit 6 controls the travel of the vehicle on the basis of signals transmitted from the ECU 2.

As shown in FIG. 1, the ECU 2 includes a road environment recognition unit 11, a maximum speed limit section setting unit 12, a traffic signal display estimating unit 13, an acceleration and deceleration section setting unit 14, and a travel plan generation unit 15.

The road environment recognition unit 11 recognizes a road environment on the route of the vehicle on the basis of the route information of the vehicle, the current position information of the vehicle, and the information about the road map around the current position of the vehicle which are transmitted from the navigation system 3. Examples of the road environment include a road shape, such as a curve or an intersection, a road gradient, a road facility, such as a crossing or a traffic signal, and other environments.

The maximum speed limit section setting unit 12 sets the maximum speed limit section in which the maximum speed of the vehicle is limited, on the basis of the road environment on the route which is recognized by the road environment recognition unit 11. For example, the maximum speed limit section setting unit 12 sets, as the maximum speed limit section, a section in which the speed of the vehicle needs to be limited in terms of safety, such as a sharp curve or an intersection, or a section in which the vehicle needs to be temporarily stopped by traffic rules, such as a crossing or a traffic signal.

The maximum speed limit section setting unit 12 sets the speed limit conditions to the set maximum speed limit section. Specifically, first, the maximum speed limit section setting unit 12 determines whether there is the maximum speed limit section of the traffic signal. When the maximum speed limit section setting unit 12 determines that there is the maximum speed limit section of the traffic signal, the traffic signal display estimating unit 13 estimates the display of the foremost traffic signal on the route.

The traffic signal display estimating unit 13 estimates whether the traffic signal is green when the vehicle reaches the traffic signal, on the basis of the current position information of the vehicle and the road map information transmitted from the navigation system 3 and the display timing information of the traffic signal transmitted from the road-to-vehicle communication unit 4. In addition, the traffic signal display estimating unit 13 may estimate the display of the traffic signal on the route of the vehicle from, for example, the display timing information of the traffic signal in a direction intersecting the direction in which the vehicle enters the intersection.

When the traffic signal display estimating unit 13 determines that the traffic signal is not green at the time the vehicle reaches the traffic signal, the maximum speed limit section setting unit 12 sets the speed limit of the speed limit conditions to 0 km/h in order to temporarily stop the vehicle in front of the traffic signal. When the traffic signal display estimating unit 13 determines that the traffic signal is green at the time the vehicle reaches the traffic signal, the maximum speed limit section setting unit 12 sets the speed limit of the maximum speed limit section to a general travel speed. When the maximum speed limit sections of the traffic signal and the intersection overlap each other as at the intersection with the traffic signal, priority is given to the speed limit conditions with a lower speed limit.

In addition, the maximum speed limit section setting unit 12 sets the speed limit conditions in the maximum speed limit section within a curve, considering lateral acceleration applied to the driver. First, the maximum speed limit section setting unit 12 sets the allowable lateral acceleration (for example, 0.25 G) of the general driver as a standard for allowable lateral acceleration. When the driver inputs an operation of changing the allowable acceleration to the touch panel, the maximum speed limit section setting unit 12 changes the level of the allowable lateral acceleration. The maximum speed limit section setting unit 12 sets, for example, 035 G as high allowable acceleration. In addition, the maximum speed limit section setting unit 12 sets, for example, 0.2 G as low allowable acceleration.

The maximum speed limit section setting unit 12 may calculate the allowable lateral acceleration from the statistical data of the lateral acceleration generated when the driver manually drives the vehicle. Specifically, the maximum speed limit section setting unit 12 regards the section in which a lateral acceleration equal to or more than 0.2 G is generated when the driver manually drives the vehicle as a curve section and can use the average of the maximum values of the lateral acceleration in each curve section as the allowable lateral acceleration.

The maximum speed limit section setting unit 12 calculates the speed limit conditions Vmax in the maximum speed limit section within the curve from the curvature information of the curve and the allowable lateral acceleration transmitted from the navigation system 3 using the following Expression 1:

$$\text{Speed limit conditions } V\text{max} = \sqrt{\text{curvature radius } R(m) \times \text{allowable lateral acceleration } G(m/s^2)}.$$

[Expression 1]

When the vehicle is maintained in a decelerated state on the curve, a driver in general is likely to feel scared. Therefore, it is preferable that the maximum speed limit section setting unit 12 complete deceleration in front of the entrance of the curve. The maximum speed limit section setting unit 12 sets the speed limit conditions such that the speed limit at the entrance of the curve is the minimum speed in the section within the curve.

The maximum speed limit section setting unit 12 also sets the speed limit conditions to the maximum speed limit sections other than the traffic signal or the curve. For example, the maximum speed limit section setting unit 12 sets the speed limit conditions based on the curve to the intersection where the vehicle turns right or left. In addition, the maximum speed limit section setting unit 12 sets the speed limit conditions in which the speed limit for temporarily stopping the vehicle is 0 km/h to the maximum speed limit section of a crossing or a temporary stop line.

The acceleration and deceleration section setting unit 14 sets the high-efficiency acceleration section D1 in which high-efficiency acceleration is performed and the free-run deceleration section D2 in which free-run deceleration is performed to sections other than the maximum speed limit section set by the maximum speed limit section setting unit 12 (see FIG. 3). The acceleration and deceleration section setting unit 14 basically sets the sections other than the maximum speed limit section so as to be divided into the high-efficiency acceleration section D1 and the free-run deceleration section D2 in order to optimize fuel efficiency. In addition, it is preferable that the high-efficiency acceleration section D1 and the free-run deceleration section D2 be consecutive.

The acceleration and deceleration section setting unit 14 sets the high-efficiency acceleration section D1 and the free-run deceleration section D2 to the maximum speed limit section. The acceleration and deceleration section setting unit 14 basically sets the free-run deceleration section D2 immediately before the maximum speed limit section (that is, closer to the vehicle side than the maximum speed limit section) and sets the high-efficiency acceleration section D1 immediately before the free-run deceleration section D2 (that is, closer to the vehicle side than the free-run deceleration section D2) on the route of the vehicle. In other words, the acceleration and deceleration section setting unit 14 sets each section on the route of the vehicle in the order of the high-efficiency acceleration section D1 and the free-nm deceleration section D2. When the vehicle needs to accelerate, for example, when there is a steep uphill road immediately before the maximum speed limit section, the high-efficiency acceleration section D1 is added in front of the maximum speed limit section.

The acceleration and deceleration section setting unit 14 sets a combination of the high-efficiency acceleration section D1 and the free-run deceleration section D2 in order to optimize fuel efficiency while satisfying the speed limit conditions of each maximum speed limit section.

The travel plan generation unit 15 generates a vehicle travel plan on the basis of the high-efficiency acceleration section D1 and the free-run deceleration section D2 set by the acceleration and deceleration section setting unit 14. The travel plan generation unit 15 determines whether there is a region in which the speed is equal to or less than 0 km/h in the speed pattern of the generated travel plan. When it is determined that there is a region in which the speed is equal to or less than 0 km/h in the speed pattern of the travel plan, the travel plan generation unit 15 sets the regenerative braking section D3 to a portion of the free-run deceleration section D2. The travel plan generation unit 15 sets the regenerative braking section D3 in which deceleration is more than that in the free-run deceleration section D2 to ensure the length of the high-efficiency acceleration section D1.

After setting the regenerative braking section D3, the travel plan generation unit 15 determines again whether there is a region in which the speed is equal to or less than 0 km/h in the speed pattern of the travel plan. When it is determined that there is a region in which the speed is equal to or less than 0 km/h in the speed pattern of the travel plan, the travel plan generation unit 15 extends the regenerative braking section D3. The travel plan generation unit 15 extends the regenerative braking section D3 with high deceleration to ensure the length of the high-efficiency acceleration section D1. The travel plan generation unit 15 repeats the process of extending the regenerative braking section D3 until the region in which the speed is equal to or less than 0 km/h is removed from the speed pattern of the travel plan.

In general, the driver brakes the vehicle and completes a deceleration operation at a position which is some distance ahead of the traffic signal, not immediately before the traffic signal, and passes through the traffic signal. Therefore, when the traffic signal display estimating unit 13 estimates that the traffic signal is green at the time the vehicle reaches the traffic signal, the travel plan generation unit 15 sets the regenerative braking section D3 ahead of that when the traffic signal display estimating unit 13 estimates that the traffic signal is not green at the time the vehicle reaches the traffic signal (estimates that the traffic signal is yellow or red).

When it is determined that there is no region in which the speed is equal to or less than 0 km/h in the speed patter of the travel plan, the travel plan generation unit 15 transmits the travel control signal based on the travel plan to the vehicle control unit 6. The vehicle control unit 6 controls the travel of the vehicle according the travel plan on the basis of the travel control signal transmitted, from the travel plan generation unit 15 of the ECU 2.

Next, a travel plan generation method using the travel plan generation device 1 will be described.

Figure 4:
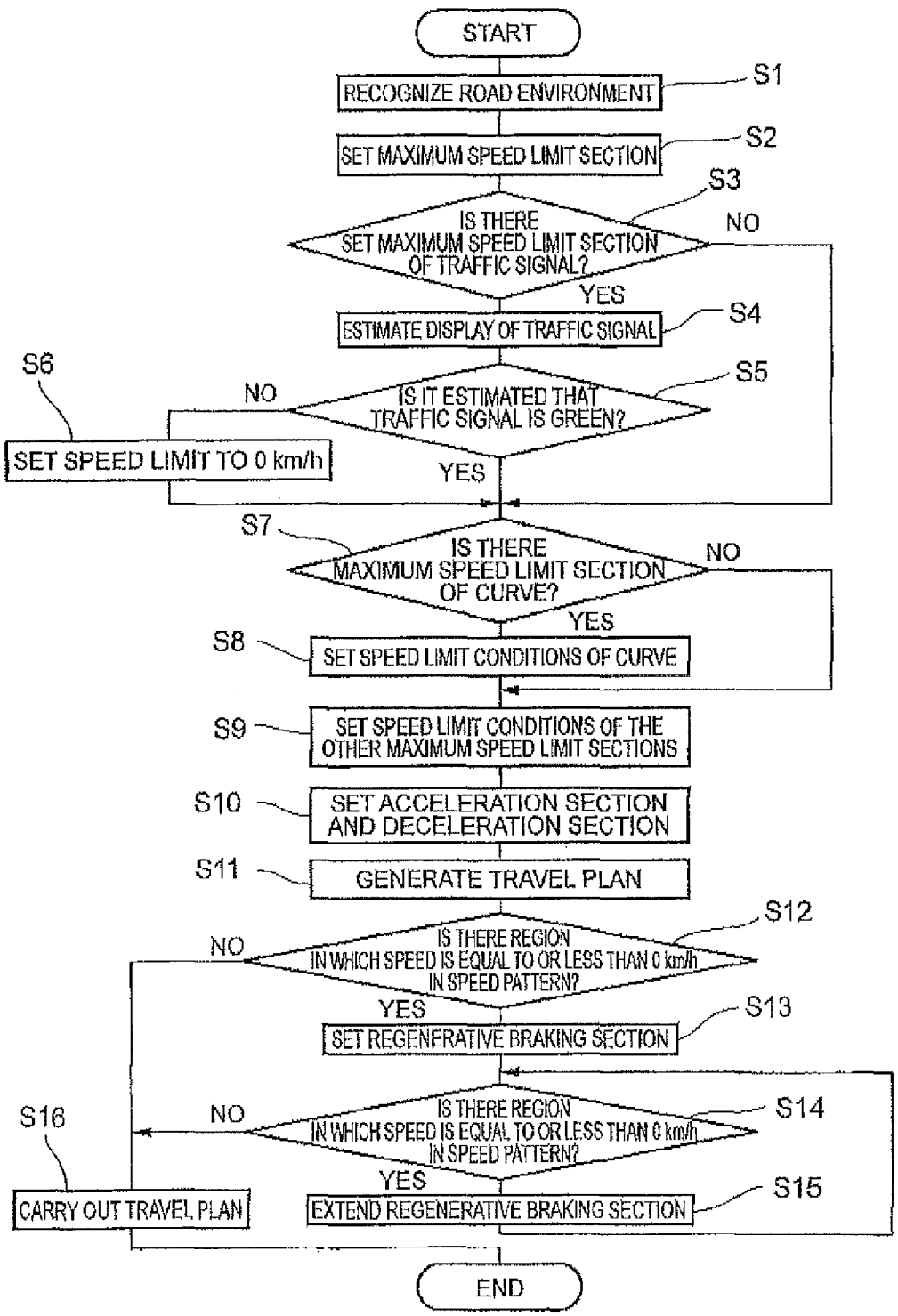
FIG. 4 is a flowchart illustrating a travel plan generation method using the travel plan generation device according to the first embodiment.

As shown in FIG. 4, in the ECU 2 of the travel plan generation device 1, first, the road environment recognition unit 11 recognizes the road environment on the route of the vehicle on the basis of the route information of the vehicle, the current position information of the vehicle, and the information about the road map around the current position of the vehicle which are transmitted from the navigation system 3 (S1).

Then, the maximum speed limit section setting unit 12 sets the maximum speed limit section in which the maximum speed of the vehicle is limited on the basis of the road environment on the route which is recognized by the road environment recognition unit 11 (S2). Step S2 corresponds to a maximum speed limit section setting step in the claim. Then, the maximum speed limit section setting unit 12 determines whether there is the maximum speed limit section of the traffic signal (S3). When the maximum speed limit section setting unit 12 determines that there is no maximum speed limit section of the traffic signal, the process proceeds to Step S7.

When the maximum speed limit section setting unit 12 determines that there is the maximum speed limit section of the traffic signal, the traffic signal display estimating unit 13 estimates the display of the traffic signal when the vehicle teaches the traffic signal, on the basis of the current position information of the vehicle and the road map information transmitted from the navigation system 3 and the display timing information of the traffic signal transmitted from the road-to-vehicle communication unit 4 (S4). The traffic signal display estimating unit 13 determines whether the traffic signal in front is green when the vehicle reaches the traffic signal on the basis of the estimation result (S5). When the traffic signal display estimating unit 13 determines that the traffic signal in front is green when the vehicle reaches the traffic signal, the process proceeds to Step S7.

When the traffic signal display estimating unit 13 determines that the traffic signal in front is not green when the vehicle reaches the traffic signal, the maximum speed limit section setting unit 12 sets the speed limit of the maximum speed limit section to 0 km/h in order to temporarily stop the vehicle in front of the traffic signal (S6).

In Step S7, the maximum speed limit section setting unit 12 determines whether there is the maximum speed limit section in the curve. When the maximum speed limit section setting unit 12 determines that there is no maximum speed limit section in the curve, the process proceeds to Step S9.

When it is determined that there is the maximum speed limit section in the curve, the maximum speed limit section setting unit 12 sets the speed limit conditions of the curve on the basis of the curvature information of the curve included in the road map information of the navigation system 3 and the allowable lateral acceleration which can be allowed by the driver (S8).

In Step S9, the maximum speed limit section setting unit 12 sets the speed limit conditions to other maximum speed limit sections. For example, the maximum speed limit section setting unit 12 sets the speed limit conditions in which the speed limit is 0 km/h to the maximum speed limit section in a crossing or a temporary stop line.

The acceleration and deceleration section setting unit 14 sets the high-efficiency acceleration section D1 and the free-run deceleration section D2 to sections other than the maximum speed limit section set by the maximum speed limit section setting unit 12 (S10). The acceleration and deceleration section setting unit 14 sets the free-run deceleration section D2 immediately before the maximum speed limit section (that is, closer to the vehicle side than the maximum speed limit section), if possible. The acceleration and deceleration section setting unit 14 sets the high-efficiency acceleration section D1 in front of the free-run deceleration section D2 (that is, closer to the vehicle side than the free-run deceleration section D2). Step S10 corresponds to an acceleration and deceleration section setting step in the claim.

The travel plan generation unit 15 generates a vehicle travel plan on the basis of the high-efficiency acceleration section D1 and the free-run deceleration section D2 set by the acceleration and deceleration section setting unit 14 (S11). Step S11 is included in a travel plan generation step in the claim. The travel plan generation unit 15 determines whether there is a region in which the speed is equal to or less than 0 km/h in the speed pattern of the generated travel plan (S12). When the travel plan generation unit 15 determines that there is no region in which the speed is equal to or less than 0 km/h in the speed pattern of the generated travel plan, the process proceeds to Step S16.

When it is determined that there is a region in which the speed is equal to or less than 0 km/h in the speed pattern of the travel plan, the travel plan generation unit 15 sets the regenerative braking section D3 to a portion of the free-run deceleration section D2 (S13). The travel plan generation unit 15 sets the regenerative braking section D3 in which deceleration is more than that in the free-run deceleration section D2 to ensure the length of the high-efficiency acceleration section D1 and improves the average speed.

Then, the travel plan generation unit 15 determines again whether there is a region in which the speed is equal to or less than 0 km/h in the speed pattern of the travel plan (S14). When it is determined that there is a region in which the speed is equal to or less than 0 km/h in the speed pattern of the travel plan, the travel plan generation unit 15 extends the regenerative braking section D3 (S15). The travel plan generation unit 15 extends the regenerative braking section D3 with high deceleration to ensure the length of the high-efficiency acceleration section D1 and further improves the average speed.

The travel plan generation unit 15 repeats the process of extending the regenerative braking section D3 until the region in which the speed is equal to or less than 0 km/h is removed from the speed pattern of the travel plan. When the travel plan generation unit 15 determines that there is no region in which the speed is equal to or less than 0 km/h in the speed pattern of the travel plan, the process proceeds to Step S16.

In Step S16, the travel plan generation unit 15 transmits the travel control signal based on the generated travel plan to the vehicle control unit 6. The vehicle control unit 6 controls the travel of the vehicle according to the travel plan, on the basis of the travel control signal transmitted from the travel plan generation unit 15 of the ECU 2.

Next, the operation and effect of the travel plan generation device 1 and the travel plan generation method according to the first embodiment will be described.

According to the travel plan generation device 1 and the travel plan generation method of the first embodiment, in the case in which the travel plan is generated using high-efficiency acceleration and free-run deceleration in order to optimize fuel efficiency, even when the region in which the speed is equal to or less than 0 km/h is generated in the speed pattern of the vehicle due to the road environment, regenerative braking is used to extend the high-efficiency acceleration section and the average speed is improved. Therefore, it is possible to remove the region in which the speed is equal to or less than 0 km/h and generate a travel plan for the actual travel of the vehicle.

In general, the driver completes deceleration at a position that is some distance ahead of the traffic signal, not immediately before the traffic signal. According to the travel plan generation device 1 and the travel plan generation method, when it is estimated that the traffic signal in the traffic signal section is green at the time the vehicle reaches the traffic signal section, the maximum deceleration section is set ahead. Therefore, it is possible to generate a travel plan capable of reducing discomfort to the driver.

Second Embodiment

Figure 5:
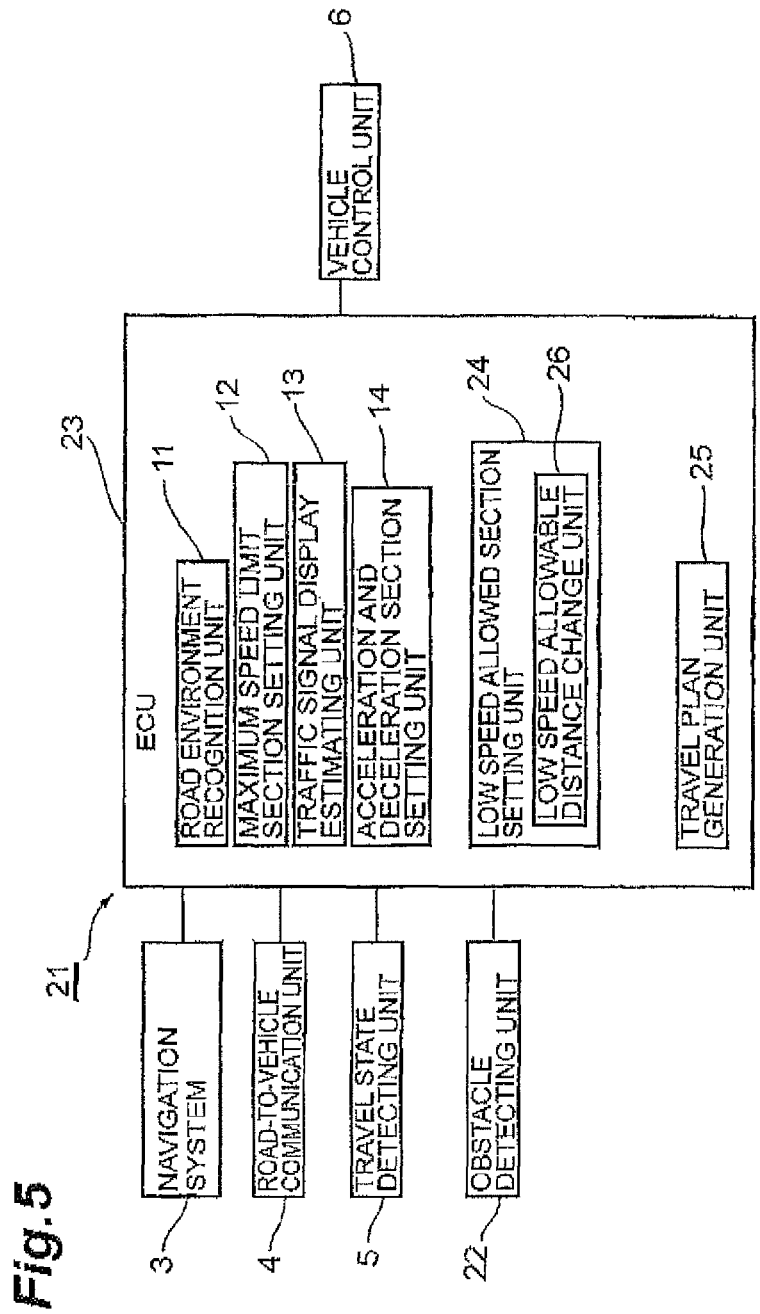
FIG. 5 is a block diagram illustrating a travel plan generation device according to a second embodiment.

As shown in FIG. 5, a travel plan generation device 21 according to a second embodiment differs from the travel plan generation device 1 according to the first embodiment in that it includes an obstacle detecting unit 22 and a low speed allowed section setting unit 24.

Reducing the speed of the vehicle at a position that is away from the maximum speed limit section, such as a curve or a crossing, is not a socially acceptable conduct, which causes discomfort to the driver or neighboring vehicles. Therefore, the travel plan generation device 21 according to the second embodiment generates a travel plan in which the vehicle does not decelerate to a predetermined low discomfort speed or less in a low speed allowed section which is set immediately before a maximum speed limit section and sections other than the maximum speed limit section.

Next, the structure of the travel plan generation device 21 according to the second embodiment will be described.

As shown in FIG. 5, the travel plan generation device 21 includes the obstacle detecting unit 22 which detects obstacles near the vehicle. The obstacle detecting unit 22 includes a plurality of sensors including a laser radar sensor and an image sensor. The obstacle detecting unit 22 detects other vehicles near the vehicle as obstacles.

The obstacle detecting unit 22 detects, as an obstacle, another vehicle following the vehicle. The following vehicle means another vehicle which follows the vehicle in a predetermined distance range from the vehicle. In addition, the obstacle detecting unit 22 detects, as an obstacle, another vehicle in front of the vehicle. The vehicle in front means another vehicle which travels in front of the vehicle in a predetermined distance range from the vehicle. The obstacle detecting unit 22 transmits obstacle information including information about the detected following vehicle and vehicle in front to an ECU 23.

The ECU 23 of the travel plan generation device 21 includes a road environment recognition unit 11, a maximum speed limit section setting unit 12, a traffic signal display estimating unit 13, an acceleration and deceleration section setting unit 14, a low speed allowed section setting unit 24, and a travel plan generation unit 25. The road environment recognition unit 11, the maximum speed limit section setting unit 12, the traffic signal display estimating unit 13, and the acceleration and deceleration section setting unit 14 have the same structure as those in the first embodiment and the description thereof will not be repeated.

Figure 6:
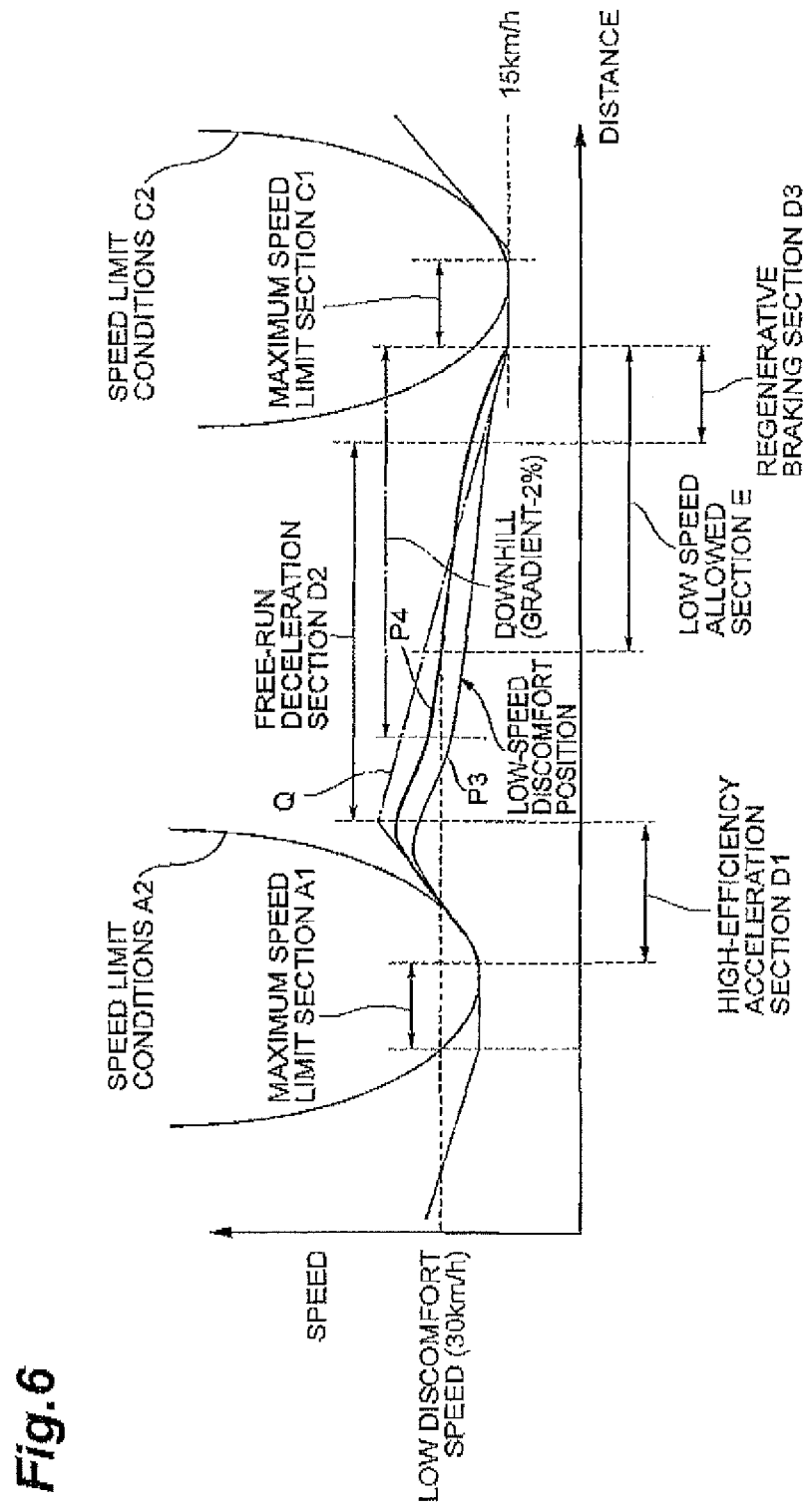
FIG. 6 is a graph illustrating the speed pattern of the travel plan along the route of the vehicle shown in FIG. 2.

Next, the low speed allowed section setting unit 24 and the travel plan generation unit 25 will be described with reference to FIG. 6. FIG. 6 is a graph illustrating the speed pattern of the travel plan along the route R of the vehicle M shown in FIG. 2. FIG. 6 shows the speed pattern when the gradient of the downhill road B is about −2%. In FIG. 6, Q indicates a target value of speed control when a road is flat.

As shown in FIG. 6, the low speed allowed section setting unit 24 sets a low speed allowed section B immediately before a maximum speed limit section C1. The low speed allowed section E means a section in which the general driver or the driver of a neighboring vehicle does not peel discomfort even when the vehicle travels at a low speed.

The low speed allowed section setting unit 24 sets a section which is in front of the maximum speed limit section C1 (that is, closer to the vehicle side than the maximum weed limit section C1) and is in a predetermined low speed allowable distance range from the maximum speed limit section C1 as the low speed allowed section E. The low speed allowed section setting unit 24 includes a low speed allowable distance change unit 26 which changes the predetermined low speed allowable distance depending on traffic conditions around the vehicle (see FIG. 5). The reference value of the predetermined low speed allowable distance is, for example, 50 m. The low speed allowable distance change unit 26 changes the low speed allowable distance on the basis of the obstacle information transmitted from the obstacle detecting unit 22.

Specifically, when it is determined that there is a following vehicle on the basis of the obstacle information transmitted from the obstacle detecting unit 22, the low speed allowable distance change unit 26 changes the low speed allowable distance to be less than that when it is determined that there is no following vehicle.

When it is determined that the distance between the vehicle and the following vehicle is less than a predetermined threshold value on the basis of the obstacle information transmitted from the obstacle detecting unit 22, the low speed allowable distance change unit 26 changes the low speed allowable distance to be less than that when the distance between the vehicle and the following vehicle is more than the predetermined threshold value. The reason is that, when the vehicle travels at a low speed, the low-speed traveling has a great effect on the following vehicle. For example, an inter-vehicle distance at the inter-vehicle time of 0.5 seconds is used as the predetermined threshold value.

When it is determined that there is a vehicle in front on the basis of the obstacle information transmitted from the obstacle detecting unit 22, the low speed allowable distance change unit 26 changes the low speed allowable distance to be less than that when it is determined that there is no vehicle in front. The process of changing the low speed allowable distance depending on whether there is a following vehicle or a vehicle in front or the distance between the following vehicle and the vehicle is not performed, for example, when the vehicle approaches the maximum speed limit section and enters the low speed allowable distance or when the vehicle enters a distance range that is the low speed allowable distance plus 20 m. The low speed allowable distance is changed at an interval of for example, 5 m.

When it is determined that the maximum speed limit section is in a poor visibility environment on the basis of the road map information transmitted from the navigation system 3, the low speed allowable distance change unit 26 changes the low speed allowable distance to be more than that when it is determined that the maximum speed limit section is not in a poor visibility environment. The poor visibility environment means an environment in which the driver feels that the visibility is poor, such as an intersection surrounded by buildings.

For example, when it is determined that the maximum speed limit section is a left-turn intersection on the basis of the road map information, the low speed allowable distance change unit 26 determines that the maximum speed limit section is in the poor visibility environment. When it is determined that the maximum speed limit section is in an urban area on the basis of the road map information, the low speed allowable distance change unit 26 determines that the maximum speed limit section is in the poor visibility environment.

When it is determined that a curve in the maximum speed limit section is a tapered curve on the basis of the road map information transmitted from the navigation system 3, the low speed allowable distance change unit 26 changes the low speed allowable distance to be more than that when it is determined that the curve is not a tapered curve. The tapered curve means a curve in which a road width at the entrance of the curve is more than that at the exit of the curve by a predetermined value or more.

The low speed allowed section setting unit 24 sets the low speed allowed section E corresponding to traffic conditions, using the low speed allowable distance which is changed depending on the traffic conditions by the low speed allowable distance change unit 26.

The travel plan generation unit 25 generates a travel plan in which there is no region in which the speed is equal to or less than 0 km/h in the speed pattern, using the same method as that used by the travel plan generation unit 15 according to the first embodiment. In addition, the travel plan generation unit 25 generates a travel plan such that the vehicle does not decelerate to a predetermined low discomfort speed or less in sections other than the low speed allowed section E and the maximum speed limit sections A1 and C1 set by the low speed allowed section setting unit 24. The low discomfort speed means a threshold speed at which the driver of the vehicle or the driver of a neighboring vehicle feels that the speed is too low. The low discomfort speed is a predetermined value (for example, 30 km/h).

A speed pattern P3 shown in FIG. 6 is a speed pattern in which the vehicle decelerates to the low discomfort speed or less in the sections other than the low speed allowed section E and the maximum speed limit sections A1 and C1. In the speed pattern P3, the vehicle travels at a low speed equal to or less than the low discomfort speed at a position in front of the low speed allowed section E in which it is assumed that the driver of the vehicle or the driver of a neighboring vehicle does not feel discomfort. In the speed pattern P3, the vehicle does not follow the general traffic flow and this traveling is not socially acceptable, which may cause discomfort to the driver of the vehicle or neighboring vehicles. Since the travel plan in which the driver peels discomfort is not used by the driver, it is necessary to reduce discomfort.

The travel plan generation unit 25 sets the regenerative braking section D3 in which deceleration is more than that in the free-run deceleration section D2 to ensure the length of the high-efficiency acceleration section D1 and improves the average speed.

The travel plan generation unit 25 performs a process of extending the regenerative braking section D3 to improve the average speed until the speed pattern in which the vehicle does not decelerate to the low discomfort speed or less, in the sections other than the low speed allowed section E and the maximum speed limit sections A1 and C1. In this way, the travel plan generation unit 25 generates the travel plan in which the vehicle does not decelerate to the low discomfort speed or less, in the sections other than the low speed allowed section E and the maximum speed limit sections A1 and C1.

In addition, the travel plan generation unit 25 changes the maximum deceleration of the regenerative braking section D3 on the basis of the traffic conditions around the vehicle. The travel plan generation unit 25 changes the maximum deceleration from a predetermined reference value. When it is determined that there is a following vehicle on the basis of the obstacle information transmitted from the obstacle detecting unit 22, the travel plan generation unit 25 changes the maximum deceleration of the regenerative braking section D3 to be more than that when it is determined that there is no following vehicle.

When it is determined that the distance between the vehicle and the following vehicle is less than a predetermined threshold value on the basis of the obstacle information transmitted from the obstacle detecting unit 22, the travel plan generation unit 25 changes the maximum deceleration of the regenerative braking section D3 to be more than that when it is determined that the distance between the vehicle and the following vehicle is more than the predetermined threshold value. The reason is that, when the vehicle travels at a low speed, the low-speed traveling has a great effect on the following vehicle.

When it is determined that there is a vehicle in front on the basis of the obstacle information transmitted from the obstacle detecting unit 22, the travel plan generation unit 25 changes the maximum deceleration of the regenerative braking section D3 to be more than that when it is determined that there is no vehicle in front. The process of changing the maximum deceleration depending on whether there is a following vehicle or a vehicle in front or the distance between the following vehicle and the vehicle is not performed, for example, when the vehicle enters the regenerative braking section D3.

When it is determined that the maximum speed limit section is in a poor visibility environment on the basis of the road map information transmitted from the navigation system 3, the travel plan generation unit 25 changes the maximum deceleration of the regenerative braking section D3 to be less than that when it is determined that the maximum speed limit section is not in a poor visibility environment.

For example, when it is determined that the maximum speed limit section is a left-turn intersection on the basis of the road map information, the travel plan generation unit 25 determines that the maximum speed limit section is in the poor visibility environment. When it is determined that the maximum speed limit section is in an urban area on the basis of the road map information, the travel plan generation unit 25 determines that the maximum speed limit section is in the poor visibility environment.

When it is determined that a curve in the maximum speed limit section is a tapered curve on the basis of the road map information transmitted from the navigation system 3, the travel plan generation unit 25 changes the maximum deceleration of the regenerative braking section D3 to be less than that when it is determined that the curve is not a tapered curve.

The travel plan generation unit 25 changes the maximum deceleration of the regenerative braking section D3 depending on the traffic conditions around the vehicle to generate a travel plan which reduces discomfort to the driver or neighboring vehicles and prevents the driver from feeling uneasy.

The travel plan generation unit 25 transmits the travel control signal based on the generated travel plan to the vehicle control unit 6. The vehicle control unit 6 controls the travel of the vehicle according to the travel plan on the basis of the travel control signal transmitted from the travel plan generation unit 25 of the ECU 23.

Next, a travel plan generation method using the travel plan generation device 21 will be described.

The travel plan generation device 21 generates a travel plan without the region in which the speed is equal to or less than 0 km/h using the same method as that used by the travel plan generation device 1 according to the first embodiment. That is, the travel plan generation device 21 performs the operation from Step S1 to Step S15 in the flowchart of FIG. 4. Then, the travel plan generation device 21 performs the process shown in the flowchart of FIG. 7, instead of Step S16 in FIG. 4.

Figure 7:
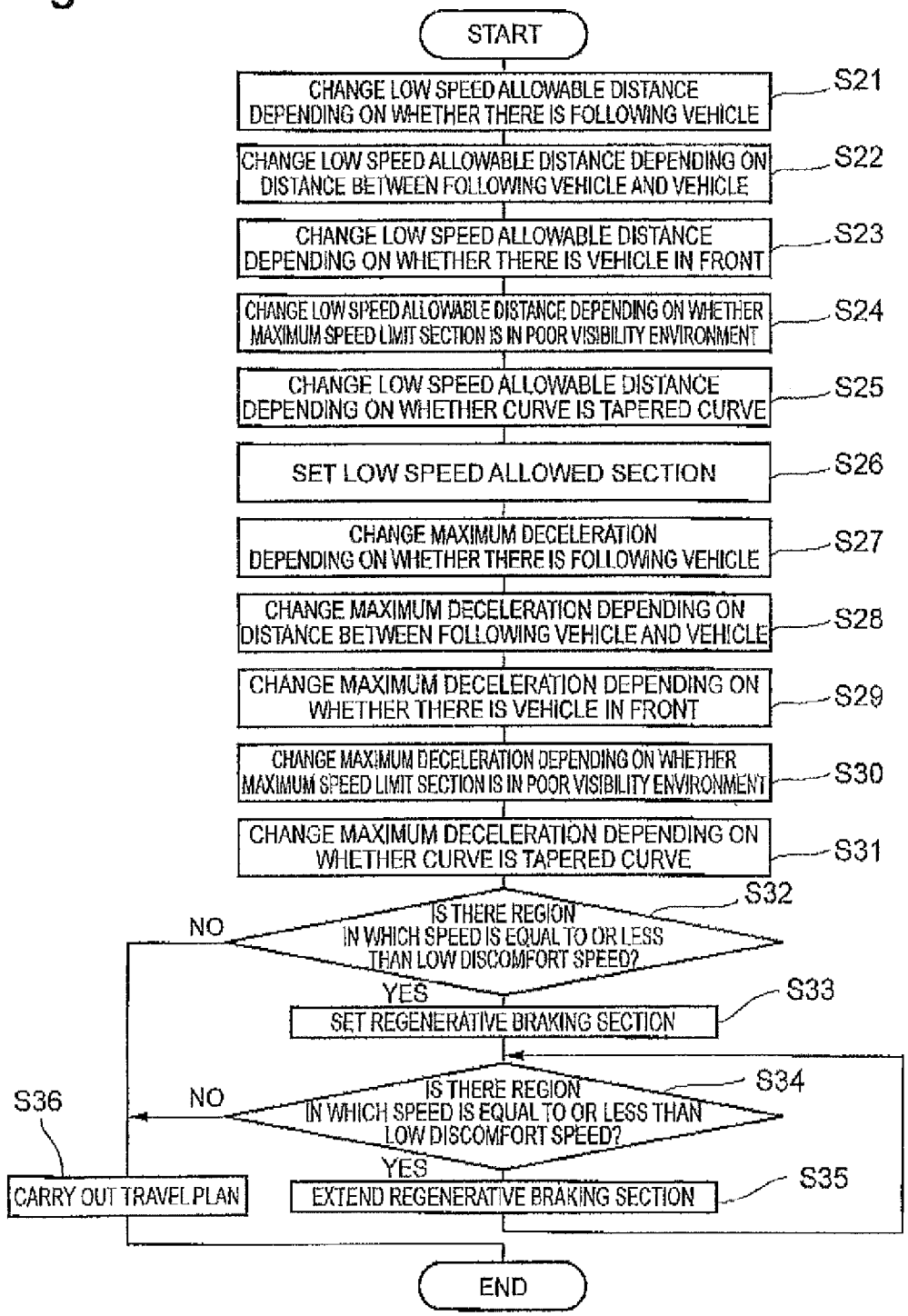
FIG. 7 is a flowchart illustrating a travel plan generation method using the travel plan generation device according to the second embodiment.

As shown in FIG. 7, in the ECU 23 of the travel plan generation device 21, the low speed allowable distance change unit 26 changes the low speed allowable distance from the predetermined reference value on the basis of the traffic conditions of the vehicle. First, the low speed allowable distance change unit 26 changes the low speed allowable distance depending on whether there is a following vehicle (S21). When it is determined that there is a following vehicle on the basis of the obstacle information transmitted from the obstacle detecting unit 22, the low speed allowable distance change unit 26 changes the low speed allowable distance to be less than that when it is determined that there is no following vehicle.

Then, the low speed allowable distance change unit 26 changes the low speed allowable distance depending on the distance between the vehicle and the following vehicle (S22). When it is determined that the distance between the vehicle and the following vehicle is less than a predetermined threshold value on the basis of the obstacle information transmitted from the obstacle detecting unit 22, the low speed allowable distance change unit 26 changes the low speed allowable distance to be less than that when it is determined that the distance between the vehicle and the following vehicle is more than the predetermined threshold value.

Then, the low speed allowable distance change unit 26 changes the low speed allowable distance depending on whether there is a vehicle in front (S23). When it is determined that there is a vehicle in front on the basis of the obstacle information transmitted from the obstacle detecting unit 22, the low speed allowable distance change unit 26 changes the low speed allowable distance to be less than that when it is determined that there is no vehicle in front.

Then, the low speed allowable distance change unit 26 changes the low speed allowable distance depending on whether the maximum speed limit section is in a poor visibility environment (S24) When it is determined that the maximum speed limit section is in the poor visibility environment on the basis of the road map information transmitted from the navigation system 3, the low speed allowable distance change unit 26 changes the low speed allowable distance to be more than that when it is determined that the maximum speed limit section is not in the poor visibility environment.

For example, when it is determined that the maximum speed limit section is a left-turn intersection on the basis of the road map information, the low speed allowable distance change unit 26 determines that the maximum speed limit section is in the poor visibility environment. When it is determined that the maximum speed limit section is in an urban area on the basis of the road map information, the low speed allowable distance change unit 26 determines that the maximum speed limit section is in the poor visibility environment.

Then, the low speed allowable distance change unit 26 changes the low speed allowable distance depending on whether a curve is a tapered curve (S25). When it is determined that a curve in the maximum speed limit section is a tapered curve on the basis of the road map information transmitted from the navigation system 3, the low speed allowable distance change unit 26 changes the low speed allowable distance to be more than that when it is determined that the curve is not a tapered curve.

Then, the low speed allowed section setting unit 24 sets a section which is in front of the maximum speed limit section C1 (that is, closer to the vehicle side than the maximum speed limit section C1) and is in a predetermined low speed allowable distance range from the maximum speed limit section C1 as the low speed allowed section E, using the low speed allowable distance changed by the low speed allowable distance change unit 26 (S26). Step S26 corresponds to a low speed allowed section setting step in the claim.

Then, the travel plan generation unit 25 changes the maximum deceleration of the regenerative braking section D3 on the basis of the traffic conditions around the vehicle. First, the travel plan generation unit 25 changes the maximum deceleration depending on whether there is a following vehicle (S27). When it is determined that there is a following vehicle on the basis of the obstacle information transmitted from the obstacle detecting unit 22, the travel plan generation unit 25 changes the maximum deceleration of the regenerative braking section D3 to be more than that when it is determined that there is no following vehicle.

Then, the travel plan generation unit 25 changes the maximum deceleration depending on the distance between the vehicle and the following vehicle (S28). When it is determined that the distance between the vehicle and the following vehicle is less than a predetermined threshold value on the basis of the obstacle information transmitted from the obstacle detecting unit 22, the travel plan generation unit 25 changes the maximum deceleration of the regenerative braking section D3 to be more than that when it is determined that the distance between the vehicle and the following vehicle is more than the predetermined threshold value.

Then, the travel plan generation unit 25 changes the maximum deceleration of the regenerative braking section D3 depending on whether there is a vehicle in front (S29). When it is determined that there is a vehicle in front on the basis of the obstacle information transmitted from the obstacle detecting unit 22, the travel plan generation unit 25 changes the maximum deceleration of the regenerative braking section D3 to be more than that when it is determined that there is no vehicle in front.

Then, the travel plan generation unit 25 changes the maximum deceleration of the regenerative braking section D3 depending on whether the maximum speed limit section is in a poor visibility environment (S30). When it is determined that the maximum speed limit section is in the poor visibility environment on the basis of the road map information from the navigation system 3, the travel plan generation unit 25 changes the maximum deceleration of the regenerative braking section D3 to be less than that when it is determined that the maximum speed limit section is not in the poor visibility environment.

For example, when it is determined that the maximum speed limit section is a left-turn intersection on the basis of the road map information, the travel plan generation unit 25 determines that the maximum speed limit section is in the poor visibility environment. When it is determined that the maximum speed limit section is in an urban area on the basis of the road map information, the travel plan generation unit 25 determines that the maximum speed limit section is in the poor visibility environment.

Then, the travel plan generation unit 25 changes the maximum deceleration of the regenerative braking section D3 depending on whether a curve is a tapered curve (S31). When it is determined that a curve in the maximum speed limit section is a tapered curve on the basis of the road map information transmitted from the navigation system 3, the travel plan generation unit 25 changes the maximum deceleration of the regenerative braking section D3 to be less than that when it is determined that the curve is not a tapered curve.

Then, the travel plan generation unit 25 determines whether there is a region in which the speed is equal to or less than the low discomfort speed in the speed pattern of the travel plan in the sections other than the low speed allowed section E and the maximum speed limit section (S32). Even when there is the region in which the speed is equal to or less than the low discomfort speed in the high-efficiency acceleration section D1 in which high-efficiency acceleration is performed, the driver of the vehicle or the driver of a neighboring vehicle does not feel discomfort. Therefore, the region in which the speed is equal to or less than the low discomfort speed in the high-efficiency acceleration section D1 is excluded from the determination target. When the travel plan generation unit 25 determines that there is no region in which the speed is equal to or less than the low discomfort speed, the process proceeds to Step S36.

When it is determined that there is a region in which the speed is equal to or less than the low discomfort speed, the travel plan generation unit 25 sets the regenerative braking section D3 to a portion of the free-run deceleration section D2 (S33). The travel plan generation unit 25 sets the regenerative braking section D3 in which deceleration is more than that in the free-run deceleration section D2 to ensure the length of the high-efficiency acceleration section D1 and improves the average speed.

Then, the travel plan generation unit 25 determines again whether there is a region in which the speed is equal to or less than the low discomfort speed in the speed pattern of the travel plan in the sections other than the low speed allowed section E and the maximum speed limit section (S34). When it is determined that there is a region in which the speed is equal to or less than the low discomfort speed, the travel plan generation unit 25 extends the regenerative braking section D3 (S35). The travel plan generation unit 25 extends the regenerative braking section D3 to ensure the length of the high-efficiency acceleration section D1 and further improves the average speed.

The travel, plan generation unit 25 repeats the process of extending the regenerative braking section D3 until the region in which the speed is equal to or less than the low discomfort speed is removed. Steps S32 to S35 are included in a travel plan generation step in the claim. When the travel plan generation unit 25 determines that there is no region in which the speed is equal to or less than the low discomfort speed, the process proceeds to Step S36.

In Step S36, the travel plan generation unit 25 transmits the travel control signal based on the generated travel plan to the vehicle control unit 6. The vehicle control unit 6 controls the travel of the vehicle according to the travel plan on the basis of the travel control signal transmitted from the travel plan generation unit 25 of the ECU 23.

Next, the operation and effect of the travel plan generation device 21 and the travel plan generation method according to the second embodiment will be described.

According to the travel plan generation device 21 and the travel plan generation method of the second embodiment, when the vehicle decelerates to the maximum speed limit section in which the maximum speed of the vehicle is limited, such as an intersection, curve, or crossing section, reducing the speed of the vehicle at a position that is away from the maximum speed limit section is not a socially acceptable conduct, which causes discomfort to the driver of the vehicle or neighboring vehicles. Therefore, a travel plan is generated in which the vehicle does not decelerate to a predetermined low discomfort speed or less in the sections other than the maximum speed limit section and the low speed allowed section. Therefore, according to the travel plan generation device 21 and the travel plan generation method, the vehicle does not travel at a sufficiently low speed to cause discomfort to the driver until it sufficiently approaches the maximum speed limit section and enters the low speed allowed section. Therefore, it is possible to generate a travel plan that is socially acceptable and reduce discomfort to the driver.

According to the travel plan generation device 21 and the travel plan generation method, the free-run deceleration section D2 is set immediately before the maximum speed limit section. Therefore, it is possible to generate a travel plan in which the average speed is high and is close to the general traveling speed, as compared to when the high-efficiency acceleration section D1 is set immediately before the maximum speed limit section. As a result, it is possible to reduce discomfort to the driver or neighboring vehicles.

According to the travel plan generation device 21 and the travel plan generation method, the high-efficiency acceleration section D1 is set before the free-run deceleration section D2. Therefore, it is possible to generate a travel plan in which the average speed is high and is close to the general traveling speed, as compared to when the free-run deceleration section is set before the high-efficiency acceleration section D1. Therefore, it is possible to reduce discomfort to the driver or neighboring vehicles.

According to the travel plan generation device 21 and the travel plan generation method, the low speed allowable distance is changed depending on the traffic conditions around the vehicle. Therefore, it is possible to generate a travel plan corresponding to the traffic conditions and reduce discomfort to the driver or neighboring vehicles.

According to the travel plan generation device 21 and the travel plan generation method, when there is another vehicle following the vehicle, the maximum deceleration of the regenerative braking section D3 increases or the low speed allowable distance decreases. Therefore, it is possible to generate a travel plan with a long acceleration section, as compared to when there is no other vehicle following the vehicle. According to the travel plan generation device 21 and the travel plan generation method, a travel plan in which the average speed is close to the general traveling speed is generated, considering the following vehicle. Therefore, it is possible to reduce discomfort to the driver and the following vehicle.

According to the travel plan generation device 21 and the travel plan generation method, when there is another vehicle in front of the vehicle, the maximum deceleration of the regenerative braking section D3 increases or the low speed allowable distance decreases. Therefore, it is possible to generate a travel plan with a long acceleration section, as compared to when there is no other vehicle in front the vehicle. According to the travel plan generation device 21 and the travel plan generation method, a travel plan in which the average speed is close to the general traveling speed is generated, considering the vehicle in front. Therefore, it is possible to reduce discomfort to the driver and the vehicle in front.

According to the travel plan generation device 21 and the travel plan generation method, when the maximum speed limit section is in the poor visibility environment, the maximum deceleration of the regenerative braking section D3 decreases or the low speed allowable distance increases. Therefore, it is possible to generate a travel plan with low deceleration, as compared to when the maximum speed limit section is not in the poor visibility environment. When the vehicle enters the poor visibility environment in which visibility is poor at a high speed, the driver is likely to feel uneasy. Therefore, according to the travel plan generation method, when the maximum speed limit section is in the poor visibility environment, the travel plan with low deceleration is generated to prevent the driver from feeling uneasy.

According to the travel plan generation device 21 and the travel plan generation method, when the maximum speed limit section is a left-turn intersection or when it is in an urban area, it is likely to be in a poor visibility environment in which visibility is poor. Therefore, when the maximum speed limit section is the left-turn intersection or when it is in the urban area, it is determined that the maximum speed limit section is in the poor visibility environment, which makes it possible to appropriately prevent the driver from feeling uneasy.

According to the travel plan generation device 21 and the travel plan generation method, when the maximum speed limit section is a tapered curve in which a road width at the entrance is more than that at the exit, the maximum deceleration of the regenerative braking section D3 decreases or the low speed allowable distance increases. Therefore, it is possible to generate a travel plan with low deceleration, as compared to when the maximum speed limit section is not the tapered curve. When the vehicle enters the tapered curve at a high speed, the driver is likely to feel uneasy. Therefore, according to the travel plan generation device 21 and the travel plan generation method, when the maximum speed limit section is the tapered carve, the travel plan with low deceleration is generated to prevent the driver from feeling uneasy.

In general, the driver brakes the vehicle to complete deceleration at a position that is some distance ahead of the traffic signal, not immediately before the traffic signal, and passes through the traffic signal. Therefore, according to the travel plan generation device 21 and the travel plan generation method, similarly to the first embodiment, when it is determined that the traffic signal in the traffic signal section is green at the time the vehicle reaches the traffic signal section, the maximum deceleration section is set ahead. Therefore, it is possible to generate a travel plan capable of reducing discomfort to the driver.

Third Embodiment

Figure 8:
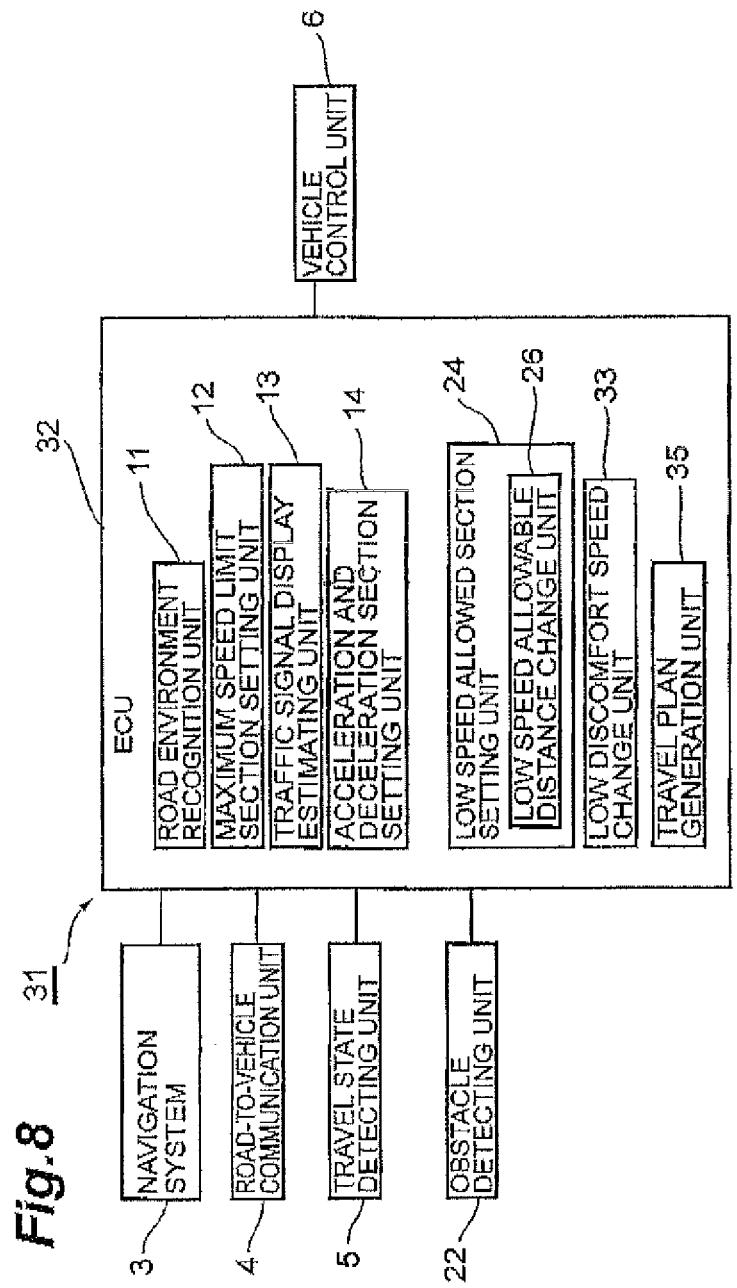
FIG. 8 is a block diagram illustrating a travel plan generation device according to a third embodiment.

As shown in FIG. 8, a travel plan generation device 31 according to a third embodiment mainly differs from the travel plan generation device 21 according to the second embodiment in that it includes a low discomfort speed change unit 33. The travel plan generation device 31 changes the low discomfort speed on the basis of the traffic conditions of the vehicle to generate a travel plan which reduces discomfort to the driver or neighboring vehicles.

An ECU 32 of the travel plan generation device 31 includes the low discomfort speed change unit 33 which changes the low discomfort speed. The low discomfort speed change unit 33 changes the low discomfort speed from a predetermined reference value.

When it is determined that there is a following vehicle on the basis of obstacle information transmitted from an obstacle detecting unit 22, the low discomfort speed change unit 33 changes the low discomfort speed to be more than that when it is determined that there is no following vehicle. When it is determined that the distance between the vehicle and the following vehicle is less than a predetermined threshold value on the basis of the obstacle information transmitted from the obstacle detecting unit 22, the low discomfort speed change unit 33 changes the low discomfort speed to be more than that when it is determined that the distance between the vehicle and the following vehicle is more than the predetermined threshold value.

When it is determined that there is a vehicle in front on the basis of the obstacle information transmitted from the obstacle detecting unit 22, the low discomfort speed change unit 33 changes the low discomfort speed to be more than that when it is determined that there is no vehicle in front.

When it is determined that the density of neighboring vehicles is more than a predetermined vehicle density threshold value on the basis of the obstacle information transmitted from the obstacle detecting unit 22, the low discomfort speed change unit 33 changes the low discomfort speed, depending on the speed of the neighboring vehicles.

Specifically, when it is determined that the density of neighboring vehicles is more than the vehicle density threshold value, the low discomfort speed change unit 33 acquires vehicle speed statistical information at the current position of the vehicle. The vehicle speed statistical information is statistics of the speed information of the neighboring vehicles at the current position of the vehicle.

The vehicle speed statistical information is acquired by, for example, the road-to-vehicle communication of a road-to-vehicle communication unit 4 with infrastructure facilities. The road-to-vehicle communication unit 4 may acquire the vehicle speed statistical information from a telematics service using, for example, a mobile phone communication network. As such, when information is acquired from an external traffic database by road-to-vehicle communication, it is possible to obtain a large amount of vehicle speed statistical information collected by a road traffic flow monitoring system or a probe system. The vehicle speed statistical information includes information about a speed distribution, an average speed, and a standard deviation at each point of time and each position.

The low discomfort speed change unit 33 may collect the speed information of the neighboring vehicles on the basis of the current position information of the vehicle and the road map information transmitted from the navigation system 3 and the obstacle information transmitted from the obstacle detecting unit 22 and create the vehicle speed statistical information of the neighboring vehicle therein. In this case, the low discomfort speed change unit 33 includes a database which stores the vehicle speed statistical information at each point of time and each position.

The low discomfort speed change unit 33 changes the low discomfort speed on the basis of the vehicle speed statistical information corresponding to the current position of the vehicle. Specifically, the low discomfort speed change unit 33 changes the low discomfort speed to a speed obtained by subtracting a value that is two times the standard deviation from the average speed in the speed distribution of the vehicle speed statistical information. When the distance between the vehicle and the following vehicle is small, the low discomfort speed change unit 33 may change the low discomfort speed to a speed obtained by subtracting the standard deviation from the average speed. The low discomfort speed is changed depending on vehicle density only when the current position of the vehicle is sufficiently far away from the maximum speed limit section, such as an intersection (for example, a position that is 50 m away from the maximum speed limit section).

Next, a travel plan generation method using the travel plan generation device 31 according to the third embodiment will be described.

The travel plan generation device 31 generates a travel plan without a region in which the speed is equal to or less than 0 km/h using the same method as that used by the travel plan generation device 1 according to the first embodiment. That is, the travel plan generation device 31 performs the operation from Step S1 to Step S15 in the flowchart of FIG. 4. Then, the travel plan generation device 31 performs a process shown in the flowchart of FIG. 9, instead of Step S16 in FIG. 4.

Figure 9:
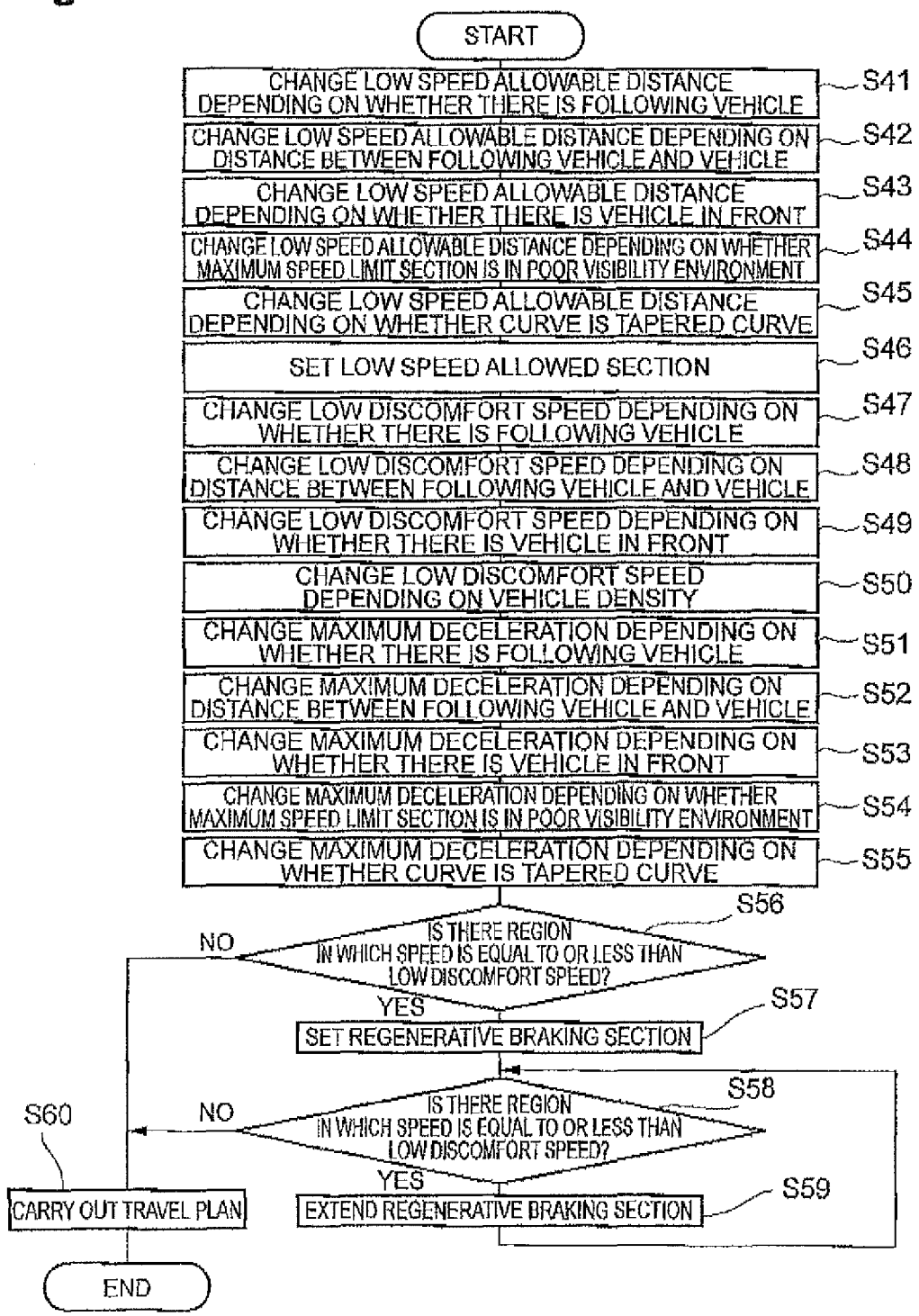
FIG. 9 is a flowchart illustrating a travel plan generation method using the travel plan generation device according to the third embodiment.

As shown in FIG. 9, in the ECU 32 of the travel plan generation device 31, a low speed allowable distance change unit 26 changes a low speed allowable distance from a predetermined reference value on the basis of the traffic conditions of the vehicle. First, the low speed allowable distance change unit 26 changes the low speed allowable distance depending on whether there is a following vehicle (S41). When it is determined that there is a following vehicle on the basis of the obstacle information transmitted from the obstacle detecting unit 22, the low speed allowable distance change unit 26 changes the low speed allowable distance to be less than that when it is determined that there is no following vehicle.

Then, the low speed allowable distance change unit 26 changes the low speed allowable distance depending on the distance between the vehicle and the following vehicle (S42). When it is determined that the distance between the vehicle and the following vehicle is less than a predetermined threshold value on the basis of the obstacle information transmitted from the obstacle detecting unit 22, the low speed allowable distance change unit 26 changes the low speed allowable distance to be less than that when it is determined that the distance between the vehicle and the following vehicle is more than the predetermined threshold value.

Then, the low speed allowable distance change unit 26 changes the low speed allowable distance depending on whether there is a vehicle in front (S43). When it is determined that there is a vehicle in front on the basis of the obstacle information transmitted from the obstacle detecting unit 22, the low speed allowable distance change unit 26 changes the low speed allowable distance to be less than that when it is determined that there is no vehicle in front.

Then, the low speed allowable distance change unit 26 changes the low speed allowable distance depending on whether the maximum speed limit section is in a poor visibility environment (S44). When it is determined that the maximum speed limit section is in the poor visibility environment on the basis of the road map information transmitted from the navigation system 3, the low speed allowable distance change unit 26 changes the low speed allowable distance to be more than that when it is determined that the maximum speed limit section is not in the poor visibility environment.

Then, the low speed allowable distance change unit 26 changes the low speed allowable distance depending on whether a curve is a tapered curve (S45). When it is determined that a curve in the maximum speed limit section is a tapered curve on the basis of the road map information transmitted from the navigation system 3, the low speed allowable distance change unit 26 changes the low speed allowable distance to be more than that when it is determined that the curve is not a tapered curve.

Then, the low speed allowed section setting unit 24 sets, as a low speed allowed section E, a section which is in front of a maximum speed limit section C1 (that is, closer to the vehicle side than the maximum speed limit section C1) and is in a low speed allowable distance range from the maximum speed limit section C1 using the low speed allowable distance changed by the low speed allowable distance change unit 26 (S46).

Then, the low discomfort speed change unit 33 changes the low discomfort speed from a predetermined reference value on the basis of traffic conditions around the vehicle. The low discomfort speed change unit 33 changes the low discomfort speed depending on whether there is a following vehicle (S47). When it is determined that there is a following vehicle on the basis of the obstacle information transmitted from the obstacle detecting unit 22, the low discomfort speed change unit 33 changes the low discomfort speed to be more than that when it is determined that there is no following vehicle.

Then, the low discomfort speed change unit 33 changes the low discomfort speed depending on the distance between the vehicle and the following vehicle (S48). When it is determined that the distance between the vehicle and the following vehicle is less than a predetermined threshold value on the basis of the obstacle information transmitted from the obstacle detecting unit 22, the low discomfort speed change unit 33 changes the low discomfort speed to be more than that when it is determined that the distance between the vehicle and the following vehicle is more than the predetermined threshold value.

Then, the low discomfort speed change unit 33 changes the low discomfort speed depending on whether there is a vehicle in front (S49). When it is determined that there is a vehicle in front on the basis of the obstacle information transmitted from the obstacle detecting unit 22, the low discomfort speed change unit 33 changes the low discomfort speed to be more than that when it is determined that there is no vehicle in front.

Then, the low discomfort speed change unit 33 changes the low discomfort speed depending on vehicle density (S50). When it is determined that the density of neighboring vehicles is more than a predetermined vehicle density threshold value on the basis of the obstacle information transmitted from the obstacle detecting unit 22, the low discomfort speed change unit 33 changes the low discomfort speed depending on the speed of the neighboring vehicles.

When it is determined that the density of the neighboring vehicles is more than the vehicle density threshold value, the low discomfort speed change unit 33 acquires the vehicle speed statistical information at the current position of the vehicle. The low discomfort speed change unit 33 changes the low discomfort speed on the basis of the vehicle speed statistical information corresponding to the current position of the vehicle. Specifically, the low discomfort speed change unit 33 changes the low discomfort speed to a speed obtained by subtracting a value that is two times the standard deviation from the average speed in the speed distribution of the vehicle speed statistical information.

Then, the travel plan generation unit 35 changes the maximum deceleration of the regenerative braking section D3 on the basis of the traffic conditions around the vehicle. First, the travel plan generation unit 35 changes the maximum deceleration depending on whether there is a following vehicle (S51). When it is determined that there is a following vehicle on the basis of the obstacle information transmitted from the obstacle detecting unit 22, the travel plan generation unit 35 changes the maximum deceleration of the regenerative braking section D3 to be more than that when it is determined that there is no following vehicle.

Then, the travel plan generation unit 35 changes the maximum deceleration depending on the distance between the vehicle and the following vehicle (S52). When it is determined that the distance between the vehicle and the following vehicle is less than a predetermined threshold value on the basis of the obstacle information transmitted from the obstacle detecting unit 22, the travel plan generation unit 35 changes the maximum deceleration of the regenerative braking section D3 to be more than that when it is determined that the distance between the vehicle and the following vehicle is more than the predetermined threshold value.

Then, the travel plan generation unit 35 changes the maximum deceleration of the regenerative braking section D3 depending on whether there is a vehicle in front (S53). When it is determined that there is a vehicle in front on the basis of the obstacle information transmitted from the obstacle detecting unit 22, the travel plan generation unit 35 changes the maximum deceleration of the regenerative braking section D3 to be more than that when it is determined that there is no vehicle in front.

Then, the travel plan generation unit 35 changes the maximum deceleration of the regenerative braking section D3 depending on whether the maximum speed limit section is in a poor visibility environment (S54). When it is determined that the maximum speed limit section is in the poor visibility environment on the basis of the road map information transmitted from the navigation system 3, the travel plan generation unit 35 changes the maximum deceleration of the regenerative braking section D3 to be less than that when it is determined that the maximum speed limit section is not in the poor visibility environment.

Then, the travel plan generation unit 35 changes the maximum deceleration of the regenerative braking section D3 depending on whether a curve is a tapered curve (S55). When it is determined that a curve in the maximum speed limit section is a tapered curve on the basis of the road map information transmitted from the navigation system 3, the travel plan generation unit 35 changes the maximum deceleration of the regenerative braking section D3 to be less than that when it is determined that the curve is not a tapered curve.

Then, the travel plan generation unit 35 determines whether there is a region in which the speed is equal to or less than the low discomfort speed in the speed pattern of the travel plan in the sections other than the low speed allowed section E and the maximum speed limit section (S56). Even when there is the region in which the speed is equal to or less than the low discomfort speed in the high-efficiency acceleration section D1 in which high-efficiency acceleration is performed, the driver of the vehicle or the driver of a neighboring vehicle does not feel discomfort. Therefore, the region in which the speed is equal to or less than the low discomfort speed in the high-efficiency acceleration section D1 is excluded from the determination target. When the travel plan generation unit 35 determines that there is no region in which the speed is equal to or less than the low discomfort speed, the process proceeds to Step S60.

When it is determined that there is a region in which the speed is equal to or less than the low discomfort speed, the travel plan generation unit 35 sets the regenerative braking section D3 to a portion of the free-run deceleration section D2 (S57). The travel plan generation unit 35 sets the regenerative braking section D3 in which deceleration is more than that in the free-run deceleration section D2 to ensure the length of the high-efficiency acceleration section D1 and improves the average speed.

Then, the travel plan generation unit 35 determines again whether there is a region in which the speed is equal to or less than the low discomfort speed in the speed pattern of the travel plan in the sections other than the low speed allowed section E and the maximum speed limit section (S58). When it is determined that there is a region in which the speed is equal to or less than the low discomfort speed, the travel plan generation unit 25 extends the regenerative braking section D3 (S59). The travel plan generation unit 35 extends the regenerative braking section D3 to ensure the length of the high-efficiency acceleration section D1 and further improves the average speed.

The travel plan generation unit 35 repeats the process of extending the regenerative braking section D3 until the region in which the speed is equal to or less than the low discomfort speed is removed. When the travel plan generation unit 35 determines that there is no region in which the speed is equal to or less than the low discomfort speed, the process proceeds to Step S60.

In Step S60, the travel plan generation unit 35 transmits the travel control signal based on the generated travel plan to the vehicle control unit 6. The vehicle control unit 6 controls the travel of the vehicle according to the travel plan on the basis of the travel control signal transmitted from the travel plan generation unit 35 of the ECU 32.

Next, the operation and effect of the travel plan generation device 31 and the travel plan generation method according to the third embodiment will be described.

According to the travel plan generation device 31 and the travel plan generation method of the third embodiment, in addition to the low speed allowable distance, the low discomfort speed is changed on the basis of the traffic conditions around the vehicle. Therefore, it is possible to generate a travel plan corresponding to the traffic conditions and further reduce discomfort to the driver or neighboring vehicles.

According to the travel plan generation device 31 and the travel plan generation method, the low discomfort speed is changed on the basis of the vehicle speed statistical information of neighboring vehicles which travel near the vehicle to generate a travel plan suitable for the flow of the neighboring vehicles. Therefore, it is possible to reduce discomfort to the driver or neighboring vehicles.

According to the travel plan generation device 31 and the travel plan generation method, since the low discomfort speed is changed to a speed obtained by subtracting a value that is two times the standard deviation from the average speed in the vehicle speed statistical information of the neighboring vehicles, the low discomfort speed can be set so as not to be less than the speed of a low-speed vehicle which is approximately one in every ten neighboring vehicles. Therefore, it is possible to generate a travel plan capable of improving fuel efficiency while reducing discomfort to the driver and neighboring vehicles.

The invention is not limited to the above-described embodiments.

For example, the invention can also be applied to vehicles other than hybrid vehicles. When the invention is applied to gasoline vehicles, an engine brake or a hydraulic brake may be used instead of the regenerative brake.

INDUSTRIAL APPLICABILITY

The invention can be used for a travel plan generation method and a travel plan generation device which generate a travel plan along the route of the vehicle.

REFERENCE SIGNS LIST 1, 21, 31: TRAVEL PLAN GENERATION DEVICE
2, 23, 32: ECU
3: NAVIGATION SYSTEM
4: ROAD-TO-VEHICLE COMMUNICATION UNIT
5: TRAVEL STATE DETECTING UNIT
6: VEHICLE CONTROL UNIT
11: ROAD ENVIRONMENT RECOGNITION UNIT
12: MAXIMUM SPEED LIMIT SECTION SETTING UNIT (MAXIMUM SPEED LIMIT SECTION SETTING PORTION)
13: TRAFFIC SIGNAL DISPLAY ESTIMATING UNIT
14: ACCELERATION AND DECELERATION SECTION SETTING UNIT (ACCELERATION AND DECELERATION SECTION SETTING PORTION)
15, 25: TRAVEL PLAN GENERATION UNIT (TRAVEL PLAN GENERATION PORTION)
22: OBSTACLE DETECTING UNIT
24: LOW SPEED ALLOWED SECTION SETTING UNIT (LOW SPEED ALLOWED SECTION SETTING PORTION)
26: LOW SPEED ALLOWABLE DISTANCE CHANGE UNIT (LOW SPEED ALLOWABLE DISTANCE CHANGE PORTION)

33: LOW DISCOMFORT SPEED CHANGE UNIT (LOW DISCOMFORT SPEED CHANGE PORTION)
A: LEFT CURVE
A1: MAXIMUM SPEED LIMIT SECTION
A2: SPEED LIMIT CONDITIONS
B: DOWNHILL ROAD
C: CROSSROADS
C1: MAXIMUM SPEED LIMIT SECTION
C2: SPEED LIMIT CONDITIONS
D1: HIGH-EFFICIENCY ACCELERATION SECTION
D2: FREE-RUN DECELERATION SECTION
D3: REGENERATIVE BRAKING SECTION
E: LOW SPEED ALLOWED SECTION
P1 TO P3: SPEED PATTERN

The invention claimed is:

1. A travel plan generation method that generates a travel plan along a route of a vehicle, comprising:
 a maximum speed limit section setting step of setting a maximum speed limit section on the route in which a maximum speed of the vehicle is limited on the basis of a road environment on the route;
 a low speed allowed section setting step of setting a low speed allowed section on the route which is in front of a start point of the maximum speed limit section on the route and is in a predetermined low speed allowable distance range from the maximum speed limit section; and
 a travel plan generation step of generating a travel plan in which the speed of the vehicle is limited to a speed limit or less in the maximum speed limit section and the speed of the vehicle is not reduced to a predetermined low discomfort speed or less in sections other than the maximum speed limit section and the low speed allowed section.

2. The travel plan generation method according to claim 1, further comprising:
 an acceleration and deceleration section setting step of setting an acceleration section in which the vehicle accelerates and a deceleration section in which the vehicle decelerates,
 wherein, in the acceleration and deceleration section setting step, the deceleration section is set immediately before the maximum speed limit section.

3. The travel plan generation method according to claim 1, further comprising:
 an acceleration and deceleration section setting step of setting an acceleration section in which the vehicle accelerates and a deceleration section in which the vehicle decelerates,
 wherein, in the acceleration and deceleration section setting step, the acceleration section is set before the deceleration section.

4. The travel plan generation method according to claim 2, wherein at least one of the low speed allowable distance and the low discomfort speed is changed on the basis of traffic conditions around the vehicle.

5. The travel plan generation method according to claim 4, wherein, when there is another vehicle following the vehicle, at least one of a process of increasing maximum deceleration of the deceleration section, a process of decreasing the low speed allowable distance, and a process of increasing the low discomfort speed, as compared to when there is no other vehicle following the vehicle, is performed.

6. The travel plan generation method according to claim 5, wherein, when there is another vehicle in front of the vehicle, at least one of the process of increasing the maximum deceleration of the deceleration section, the process of decreasing the low speed allowable distance, and the process of increasing the low discomfort speed, as compared to when there is no other vehicle in front of the vehicle, is performed.

7. The travel plan generation method according to claim 4, wherein, when the density of other vehicles around the vehicle is more than a predetermined vehicle density threshold value, the low discomfort speed is changed on the basis of vehicle speed statistical information of neighboring vehicles which travel near the vehicle.

8. The travel plan generation method according to claim 7, wherein, when the density of other vehicles around the vehicle is more than the predetermined vehicle density threshold value, the low discomfort speed is changed to a speed obtained by subtracting a value that is two times a standard deviation from an average speed in the vehicle speed statistical information.

9. The travel plan generation method according to claim 1, wherein, when the maximum speed limit section is in a poor visibility environment, at least one of a process of decreasing maximum deceleration of the deceleration section and a process of increasing the low speed allowable distance, as compared to when the maximum speed limit section is not in the poor visibility environment, is performed.

10. The travel plan generation method according to claim 9, wherein, when the maximum speed limit section is a left-turn intersection or when the maximum speed limit section is in an urban area, it is determined that the maximum speed limit section is in the poor visibility environment.

11. The travel plan generation method according to claim 1, wherein, when the maximum speed limit section is a tapered curve, at least one of a process of decreasing maximum deceleration of the deceleration section and a process of increasing the low speed allowable distance, as compared to when the maximum speed limit section is not the tapered curve, is performed.

12. The travel plan generation method according to claim 1, wherein, when the maximum speed limit section is a traffic signal section and it is estimated that a traffic signal in the traffic signal section is green at the time the vehicle reaches the traffic signal section, a maximum deceleration section of the deceleration section is set ahead of that when it is estimated that the traffic signal in the traffic signal section is not green at the time the vehicle reaches the traffic signal section.

13. A travel plan generation device that generates a travel plan along a route of a vehicle, comprising:
 a maximum speed limit section setting unit that sets a maximum speed limit section on the route in which a maximum speed of the vehicle is limited on the basis of a road environment on the route;
 a low speed allowed section setting unit that sets a low speed allowed section on the route which is in front of a start point of the maximum speed limit section on the route and is in a predetermined low speed allowable distance range from the maximum speed limit section; and
 a travel plan generation unit that generates a travel plan in which the speed of the vehicle is limited to a speed limit or less in the maximum speed limit section and the speed of the vehicle is not reduced to a predetermined low discomfort speed or less in sections other than the maximum speed limit section and the low speed allowed section.

14. The travel plan generation device according to claim 13, further comprising:
an acceleration and deceleration section setting unit that sets an acceleration section in which the vehicle accelerates and a deceleration section in which the vehicle decelerates,
wherein the acceleration and deceleration section setting unit sets the deceleration section immediately before the maximum speed limit section.

15. The travel plan generation device according to claim 13, further comprising:
an acceleration and deceleration section setting unit that sets an acceleration section in which the vehicle accelerates and a deceleration section in which the vehicle decelerates,
wherein the acceleration and deceleration section setting unit sets the acceleration section in front of the deceleration section.

16. The travel plan generation device according to claim 14,
wherein at least one of the low speed allowable distance and the low discomfort speed is changed on the basis of traffic conditions around the vehicle.

17. The travel plan generation device according to claim 16,
wherein, when there is another vehicle following the vehicle, at least one of a process of increasing maximum deceleration of the deceleration section, a process of decreasing the low speed allowable distance, and a process of increasing the low discomfort speed, as compared to when there is no other vehicle following the vehicle, is performed.

18. The travel plan generation device according to claim 17,
wherein, when there is another vehicle in front of the vehicle, at least one of the process of increasing the maximum deceleration of the deceleration section, the process of decreasing the low speed allowable distance, and the process of increasing the low discomfort speed, as compared to when there is no other vehicle in front of the vehicle, is performed.

19. The travel plan generation device according to claim 16,
wherein, when the density of other vehicles around the vehicle is more than a predetermined vehicle density threshold value, the low discomfort speed is changed on the basis of vehicle speed statistical information of neighboring vehicles which travel near the vehicle.

20. The travel plan generation device according to claim 19,
wherein, when the density of other vehicles around the vehicle is more than the predetermined vehicle density threshold value, the low discomfort speed is changed to a speed obtained by subtracting a value that is two times a standard deviation from an average speed in the vehicle speed statistical information.

21. The travel plan generation device according to claim 13,
wherein, when the maximum speed limit section is in a poor visibility environment, at least one of a process of decreasing maximum deceleration of the deceleration section and a process of increasing the low speed allowable distance, as compared to when the maximum speed limit section is not in the poor visibility environment, is performed.

22. The travel plan generation device according to claim 21,
wherein, when the maximum speed limit section is a left-turn intersection or when the maximum speed limit section is in an urban area, it is determined that the maximum speed limit section is in the poor visibility environment.

23. The travel plan generation device according to claim 13,
wherein, when the maximum speed limit section is a tapered curve, at least one of a process of decreasing maximum deceleration of the deceleration section and a process of increasing the low speed allowable distance, as compared to when the maximum speed limit section is not the tapered curve, is performed.

24. The travel plan generation device according to claim 13,
wherein, when the maximum speed limit section is a traffic signal section and it is estimated that a traffic signal in the traffic signal section is green at the time the vehicle reaches the traffic signal section, a maximum deceleration section of the deceleration section is set ahead of that when it is estimated that the traffic signal in the traffic signal section is not green at the time the vehicle reaches the traffic signal section.

* * * * *